(12) United States Patent
Godager

(10) Patent No.: US 8,912,852 B2
(45) Date of Patent: Dec. 16, 2014

(54) QUARTZ PRESSURE AND TEMPERATURE TRANSDUCER ASSEMBLY WITH DYNAMIC CORRECTION

(75) Inventor: Oivind Godager, Sandefjord (NO)

(73) Assignee: Sensor Developments AS, Sandefjord (NO)

( * ) Notice: Subject to any disclaimer, the term of this patent is extended or adjusted under 35 U.S.C. 154(b) by 195 days.

(21) Appl. No.: 13/513,854

(22) PCT Filed: Nov. 30, 2010

(86) PCT No.: PCT/GB2010/002201
§ 371 (c)(1),
(2), (4) Date: Aug. 10, 2012

(87) PCT Pub. No.: WO2011/067556
PCT Pub. Date: Jun. 9, 2011

(65) Prior Publication Data
US 2012/0306581 A1 Dec. 6, 2012

(30) Foreign Application Priority Data

Dec. 4, 2009 (GB) .................................... 0921342.2

(51) Int. Cl.
*H03L 7/00* (2006.01)
*G01K 7/32* (2006.01)
*E21B 47/06* (2012.01)
*G01L 19/04* (2006.01)
*G01L 9/00* (2006.01)

(52) U.S. Cl.
CPC ................ *G01L 9/0022* (2013.01); *G01K 7/32* (2013.01); *E21B 47/06* (2013.01); *G01L 19/04* (2013.01)
USPC ................... 331/2; 331/46; 331/56; 331/176

(58) Field of Classification Search
USPC ............................ 331/2, 46, 56; 73/702, 708
See application file for complete search history.

(56) References Cited

U.S. PATENT DOCUMENTS 3,355,949 A * 12/1967 Elwood et al. ................ 374/117
4,760,351 A * 7/1988 Newell et al. ................... 331/48
(Continued)

FOREIGN PATENT DOCUMENTS

| GB | 2379983 A | 3/2003 |
| WO | 01/75410 A1 | 10/2001 |
| WO | 2005/106452 A3 | 11/2005 |
| WO | 2007/085934 A1 | 8/2007 |

OTHER PUBLICATIONS

International Search Report from PCT/GB2010/02201 issued on Feb. 3, 2011.
(Continued)

*Primary Examiner* — Joseph Chang
*Assistant Examiner* — Jeffrey Shin
(74) *Attorney, Agent, or Firm* — Reinhart Boerner Van Deuren s.c.

(57) ABSTRACT

A quartz transducer having four or more crystal-controlled oscillators intended for measurement of applied pressure and temperature. All four oscillators are controlled by crystal quartz resonators operating in the thickness-shear mode. Two crystals measure the pressure and temperature respectively. A third crystal is a reference, and the fourth crystal may be another reference crystal or a second temperature crystal. The output of the latter is either phase leading or phase lagging the thermal response of the main temperature sensor.

40 Claims, 21 Drawing Sheets

(56) References Cited

U.S. PATENT DOCUMENTS

| | | | |
|---|---|---|---|
| 5,200,714 A | | 4/1993 | Hayashi |
| 5,231,880 A | * | 8/1993 | Ward et al. .................. 73/702 |
| 6,279,405 B1 | * | 8/2001 | Clark et al. .............. 73/861.42 |
| 6,831,525 B1 | * | 12/2004 | Beaudin et al. ............. 331/176 |
| 2003/0154031 A1 | | 8/2003 | Potyrailo et al. |
| 2004/0221655 A1 | | 11/2004 | Chen et al. |
| 2005/0007887 A1 | | 1/2005 | Sorrells et al. |
| 2009/0187345 A1 | | 7/2009 | Blanz |

OTHER PUBLICATIONS

Great Britain Search Report from GB0921342.2 issued on Apr. 12, 2010.

* cited by examiner

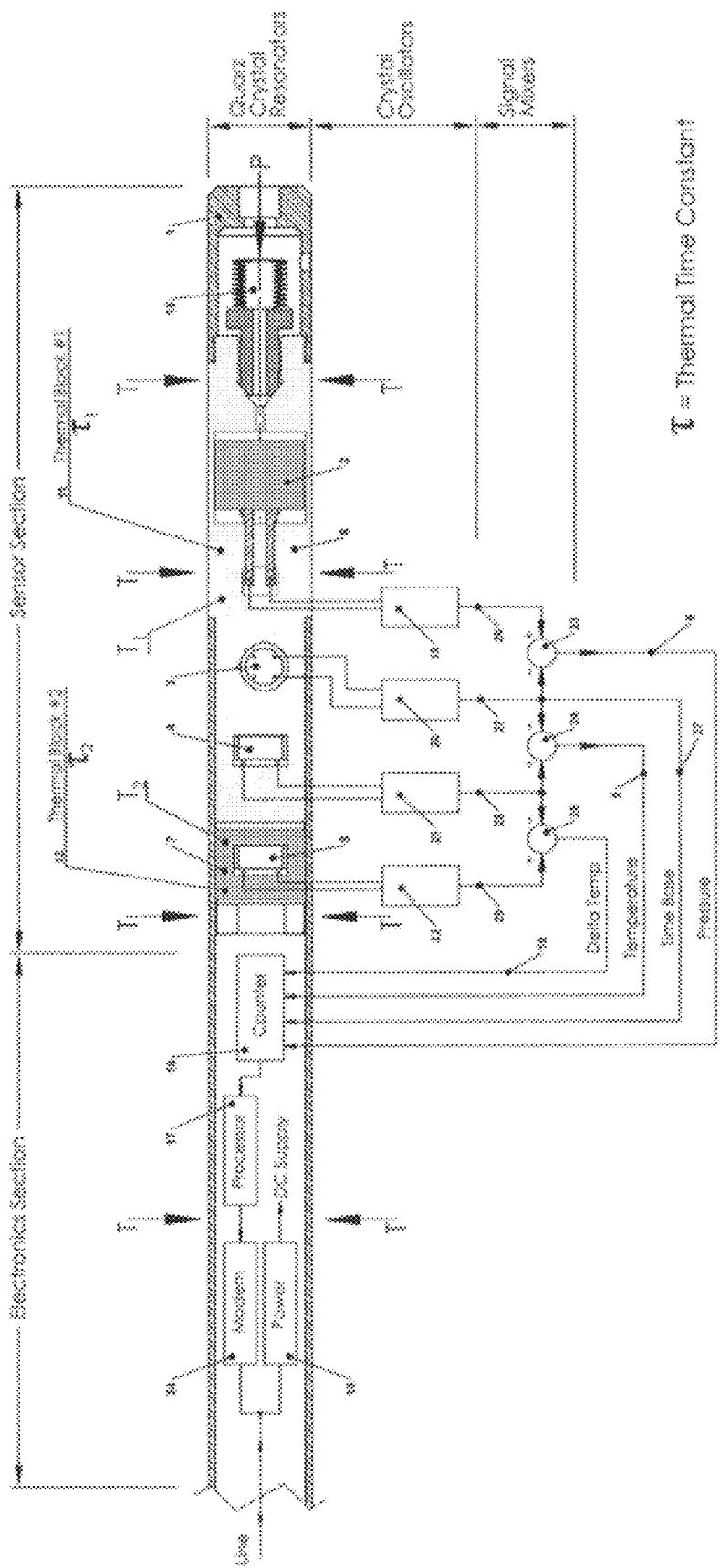

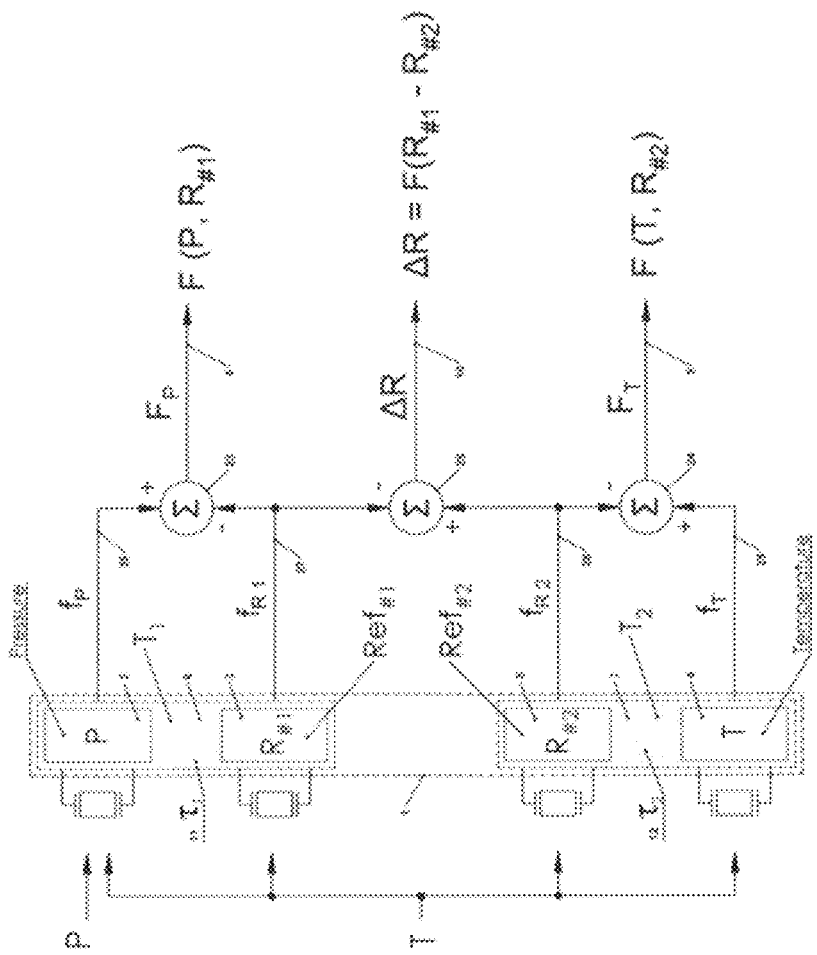

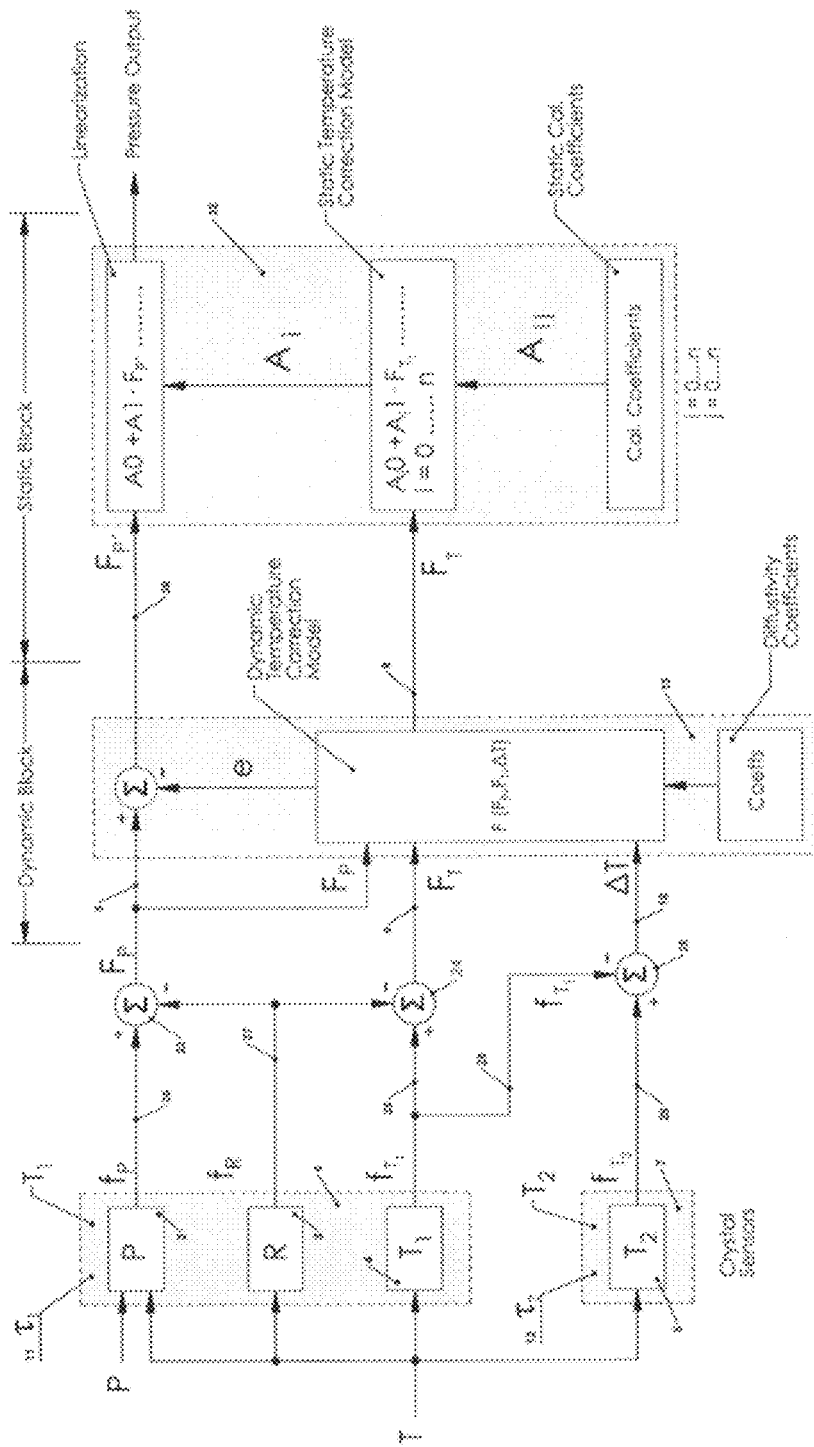

Signal Processing Diagram for Pressure Measurement
Providing Dynamic Temperature Correction Signal Processing Chart For Temperature Measurement
Providing Dynamic Temperature Correction Signal Processing Chart For Temperature Measurement
Providing Dynamic Temperature Correction

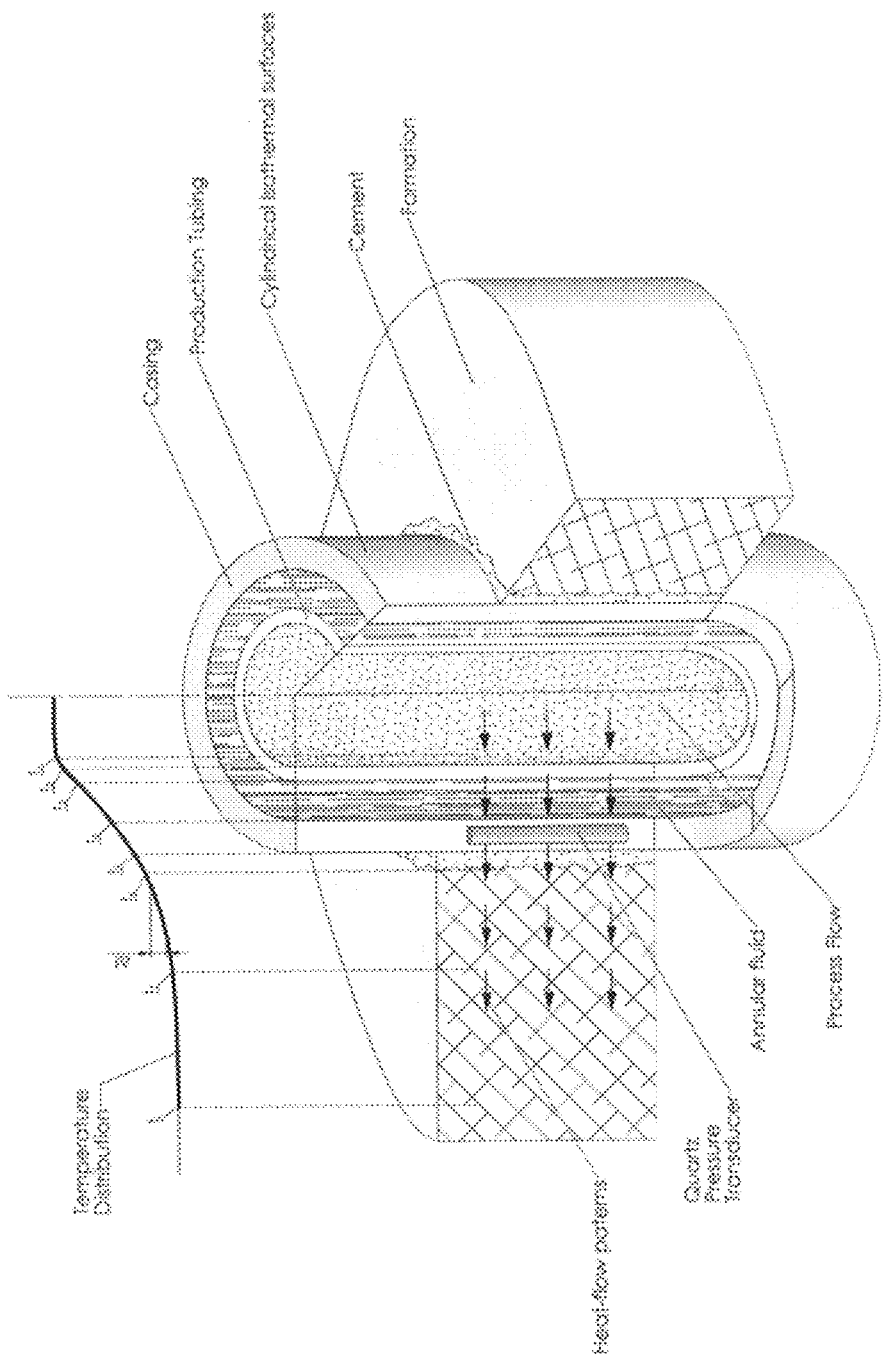

Envisioned temperature profile induced by heat conduction from the production media thru the weelbore conduits Heat flow in the qartz pressure and temperature transducer, assuming $t_3 > t_4$

QUARTZ PRESSURE AND TEMPERATURE TRANSDUCER ASSEMBLY WITH DYNAMIC CORRECTION

CROSS-REFERENCE TO RELATED APPLICATION

This patent application is the national entry of International Patent Application No. PCT/GB2010/002201, filed on Nov. 30, 2010, also entitled "Quartz Pressure and Temperature Transducer Assembly With Dynamic Correction," which in turn claimed the benefit of Great Britain Patent Application No. 0921342.2, filed on Dec. 4, 2009, again entitled "Quartz Pressure and Temperature Transducer Assembly With Dynamic Correction," both of which are assigned to the assignee of the present invention and both of which are hereby incorporated herein by reference in their entirety.

BACKGROUND OF THE INVENTION

Field of the Invention

The present invention relates generally to a pressure measuring device and more particularly to a quartz crystal pressure and temperature transducer assembly having improved error correction when subjected to pressure and temperature gradients.

In nearly all phases of oil and gas exploration and production, it is essential to have accurate knowledge of both pressure and temperature at a given or specific location in a reservoir or borehole. For example, during a production phase, reservoir management engineers currently take advantage of monitored pressure and temperature in a well and use it for their indicative and model relationship to map the reservoir and understand its complexity in order to optimize performance as well as their assets. Instruments used for this kind of surveying or a permanently monitoring application generally include a high accuracy pressure sensor device.

In prior art systems, quartz pressure and/or temperature transducers consist of precision quartz resonators and are known to be very accurate for pressure and temperature determinations. However, their manufacture and method of thermally compensating is based on stable and static wellbore conditions where the temperature is uniform throughout the transducer.

For example, U.S. Pat. No. 5,231,880, to Ward et al., discloses a pressure transducer assembly suitable for downhole use and is based upon crystal quartz resonators and associated electronics to drive and process the signals. U.S. Pat. No. 5,471,882, to Wiggins, is an improvement on the pressure transducer level in that the inherent quartz pressure and temperature resonators have been given a matched thermal response to temperature changes. However, the aforementioned transducers only provide static temperature compensation, and are a good representation of prior art quartz pressure transducers used for borehole applications. The Ward et al. Patent and the Wiggins Patent provide no form of dynamic temperature compensation of their pressure and temperature determination since they provide no means of management for the heat-balance within the transducers. This limits their effectiveness since they do not predict the correct pressure and temperature of the environment to which they are exposed if the conditions are unstable and subject to change, and they can therefore produce gross offset in the pressure and temperature determination.

Typically, an oilwell will have a relatively warm fluid production from reservoir to surface. As the production flow rises to the surface, energy will be lost by means of heat transfer in the well. Moreover, since the production media in the tubing is the warmer medium, a radial heat flow will appear through the wellbore conduits and out to the surrounding formation. In turn, the colder the formation gets the more heat is lost. In a permanent pressure monitor application, the placement of the quartz pressure transducer is typically somewhere at the outer boundaries of the wellbore conduit. As heat is lost to the surroundings, the loss creates cylindrical isothermal temperature surfaces as heat progress outwards through the wellbore conduits to the formation. In turn, this makes the location of the transducer significant and dependent upon a temperature gradient, and the ongoing monitoring application would require the involvement of dynamic compensation techniques in order to provide accurate and reliable pressure and temperature determinations.

Generally, the thermal heat balance of a Quartz Pressure Transducer in a borehole or oil/gas well will be affected by one or more of the following parameters: flow rate changes, fluid or gas composition changes within the production or injection tubing, fluid or gas composition changes in the annular volumes of the wellbore, direct pressure changes in the reservoir or induced at the surface, or any combination of the above. Furthermore, pressure changes in the well will cause temperature change within the transducer due to adiabatic effects within the transducer oil-fill as well as the quartz resonator pressure sensor itself. Moreover, the main concern is the fidelity or faithfulness of the transducer response as in use it exhibits a continuous rate of change in temperature induced by the well production and load as well as the physical properties of the environment. In real well pressure/temperature monitoring applications, the prior art quartz transducers such as given in the Ward et al. Patent, the Wiggins Patent, U.S. Pat. No. 4,802,370, to Eernisse et al., U.S. Pat. No. 3,561,832, to Karrer et al., and U.S. Pat. No. 3,355,949, to Elwood et al., provide static temperature compensation only, and they do not compensate for all the variations which results from the implications considered above. To be more effective, the application requires a Quartz Pressure and Temperature Transducer to be dynamic and be adaptable to the changes.

To provide accurate measurements using crystal quartz sensor technology in temperature gradient environments, some knowledge and measurement of the thermal stability of the system and the quartz transducer is required. Thermal response belongs, fundamentally, in the realm of transient heat transfer. The rate of response of the quartz resonator pressure and temperature sensors clearly depends on the physical properties of the transducer embodiment, the physical properties of its environment as well as the dynamical properties of its environment. Amplifying on this, and the fact that physical properties normally change with temperature, it follows that the response time of the transducer will vary with the temperature level. Therefore, the present invention confines attention to make certain necessary modifications to the traditional transducer design as well as the concept of how to temperature compensate its outputs. This is achieved by implementing a dynamic feed-forward compensation technique that is directly driven by the temperature level and the rate of change in temperature that the transducer exhibits.

To manage this task a mathematical thermal model describing the temperature behavior of the transducer quartz pressure and temperature resonators is derived. The model is based on a theorem of heat and energy-balance which defines that heat will not be lost, but can be moved, accumulated, and/or energy transferred only, and is used for dynamic compensation means. Further, the transducer is provided with sensors to measure the temperature level as well as the temperature gradient. In turn, the temperature level and rate sensor outputs are inputs to the thermal models and provide means of dynamic feed-forward correction to the output of the quartz resonator temperature and pressure sensors. Furthermore, due to the feed-forward technique, it makes the inherent transducer embodiment become a fast and accurate temperature compensated pressure and temperature transducer, and not just a temperature compensated pressure transducer as in the prior art systems.

It is therefore desirable to predict how much corrective action a change in temperature will require to correct output data. This has been greatly improved by the thermal management and signal processing of the transducer embodiments of this invention. The Quartz Pressure and Temperature Transducer Assemblies have a split thermal configuration that includes two individual quartz resonator temperature sensors. This is a unique feature in that a mixing of the two temperature sensors is a direct measure of the temperature gradient or heat balance of the transducer sensors. In turn, the output is dynamic, and controls how much and when corrective action is required by the feed-forward correction system in order to minimize the offsets of the transducer pressure and temperature determinations.

SUMMARY OF THE INVENTION

The present invention relates in general to a pressure and temperature measuring device and more particularly to a Quartz Pressure and Temperature Transducer Assembly with Dynamic Correction intended for use in non-static environments. To measure pressure and temperature, the transducer provides a crystal quartz sensor set consisting of one pressure, two temperature, and one reference resonator. All four crystals vibrate in the thickness sheer mode and have their own oscillator that provides a frequency output. The quartz resonator pressure sensor is sensing the pressure of the media to which the transducer is exposed, and the output is both pressure and temperature sensitive.

The two quartz resonator temperature sensors are temperature sensitive only and have the same temperature versus frequency characteristics. The function of the first quartz resonator temperature sensor is two-fold. The first function is to measure the temperature to which the transducer is exposed, and the second function is to compensate or correct the static temperature level effects of the quartz resonator pressure sensor. The function of the second quartz resonator temperature sensor is to provide means of dynamic correction of the transducer pressure and temperature determination. More particularly, the output of the second temperature resonator is mixed with the first, providing a means of "differential temperature" measurement. The product of the two is a dynamic measure, directly representing the transducer response to temperature, and utilizes the usage and the fact that the second resonator temperature sensor is configured to have a faster response to temperature change than the first. Amplifying on this, it follows that the differential temperature measurement derived is a footprint of the sensor response since it possesses a dynamic output that varies with the mass velocity of its environment. By dynamic means, this is an ideal input to use in a feed-forward correction system to provide a fast and accurate pressure and temperature measurements under non-static conditions.

Finally, the quartz resonator reference is used to process the signals of the pressure and temperature resonators and is typically made in a Sensitivity Cut ("SC") type cut, which possess very little temperature sensitivity. The "SC" cut is a doubly rotated crystal quartz cut which results in the property that the resonator frequency varies little with wide variations in temperature. The quartz resonator reference is the "time-base" of the transducer and is used internally as time and signal reference to mix and to process the frequency signals from the pressure and temperature sensor oscillators.

More particularly, the present invention provides a thermal management consisting of two temperature sensors. Each temperature resonator is mounted to its own isothermal block, one having slightly more mass than the other. As one temperature resonator is given more mass than the other the sensors will apparently have different time constants. By mixing the frequency outputs of the two quartz temperature crystal resonators, the mixer will produce a frequency signal that is proportional to the temperature difference between the two sensors and the transducer environment. Amplifying on this, the mixer outputs "bring forward" a dynamic measurement representing the thermal gradient or stability of the Quartz Pressure and Temperature Transducer Assembly. This is the case whether the gradient is induced directly by temperature change of the environment, or caused by adiabatic effect within the transducer, due to pressure change. Thus, the dual time-constant configuration is unique, since it exactly monitors the temperature response behavior of the transducer embodiment. Together with the temperature level, the two thermal measurements enhance the fidelity to correct the gradient disturbance to the pressure and temperature determination of the transducer.

According to the present invention, there is provided a transducer assembly, comprising: four or more crystal controlled oscillators; four or more thickness shear mode crystal quartz resonators, wherein each oscillator is controlled by the associated resonator; a first and second quartz resonator are a pressure and a reference resonator, configured together as a pressure sensor providing a frequency output; a third crystal resonator is a temperature resonator, configured as a temperature sensor providing frequency output; and a fourth crystal resonator is a temperature sensor. Preferred and optional features of the invention will be clear from the accompanying claims and from the detailed description of two illustrative embodiments which follow.

DESCRIPTION OF THE DRAWINGS

The above description and other features of the present invention will be more fully understood from the reading of the ensuing description of the preferred embodiments given with reference to the appended drawings in which FIGS. 1a, 2a, 3a, . . . etc. refer to a first embodiment of the present invention, and FIGS. 1b, 2b, 3b, . . . etc. refer to a second embodiment, in which:

FIGS. 2a and 2b are another set of schematics representation of the transducer showing its configuration and signal flow;

FIGS. 4a and 4b are schematics showing the primary signal routing and the pre-processing of the raw resonator sensor signals;

FIGS. 5a and 5b are schematics showing the full processing of the pressure determination of the transducer, including the dynamic and static temperature corrections;

FIGS. 8a and 8b are schematics showing the typical radial heat flow and the temperature distribution from a producing oil/gas well to the formation of an application of the invention providing an annular mounted Pressure and Temperature Transducer Assembly;

DETAILED DESCRIPTION OF THE PREFERRED EMBODIMENT

Two embodiments of the present invention will be described in context of pressure and temperature being the primary parameters to be measured, and to which a transducer 1 is responsive. Figures are included to show the configuration of the two embodiments of the transducer 1.

Figure 1A:
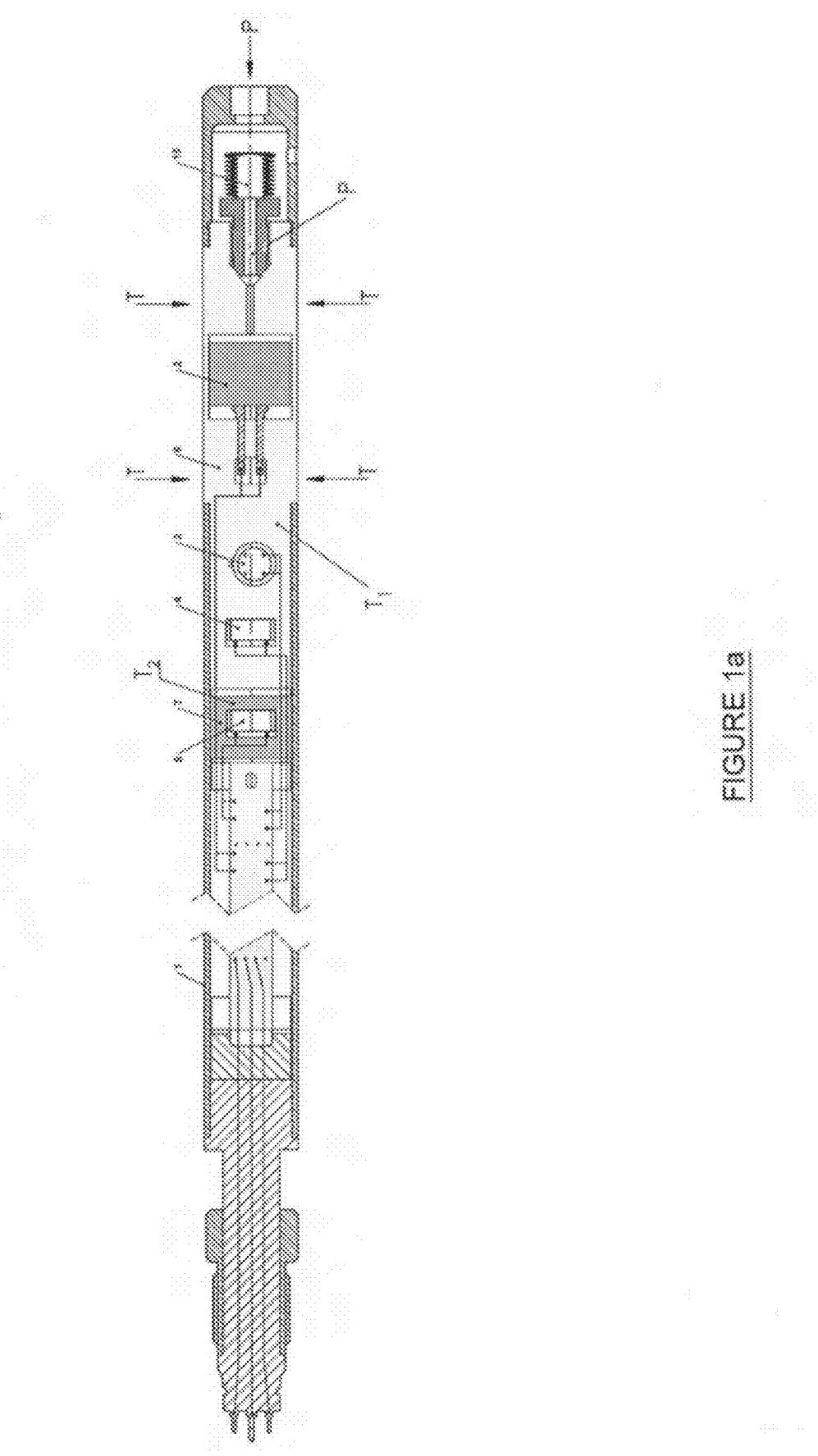
FIGS. 1a and 1b are schematics showing the outline of the Pressure and Temperature Transducer Assembly with its main components.

FIG. 1a shows a first embodiment of the present invention. A section 6 is a thermal block housing the main pressure and temperature measuring portion of the transducer 1, while a section 7 is the secondary thermal block housing a gradient temperature sensor 5.

Two crystals 3 and 4 are shown as being enclosed in the same environment and protected from pressure by being enclosed in an atmosphere where the pressure remains constant at all times. They are, however, subject to the effects of temperature and temperature change. The temperature change is a function of one or more of the temperature level, the physical properties of the thermal block 6, and the crystals 2, 3, and 4 as configured, and is characterized by a thermal time constant 11 (see FIGS. 2a and 3a).

The crystal 2 is mounted in substantially the same environment as the crystals 3 and 4, but it is mounted in such a manner that it is subject to both temperature and pressure. Further, the pressure sensor crystal 2 is placed in a chamber that is part of and is enclosed by the thermal block 6, and which is filled with an inert oil-fill. In turn, the oil-fill is pressurized through a process isolating bellows 15 of which its exterior is exposed to the environment of the transducer 1. The temperature gradient crystal sensor 5 is housed in the thermal block 7, and is enclosed in the same atmosphere as the crystals 3 and 4, which is being protected from pressure. The temperature gradient sensor 5 is subject to temperature and temperature change. As with the crystals 3 and 4, the temperature change is a function of temperature level, the physical properties of the thermal block 7 and the crystal 5 as configured and characterized by a thermal time constant 12. All of the crystals referenced are made in thickness shear mode.

Figure 1B:
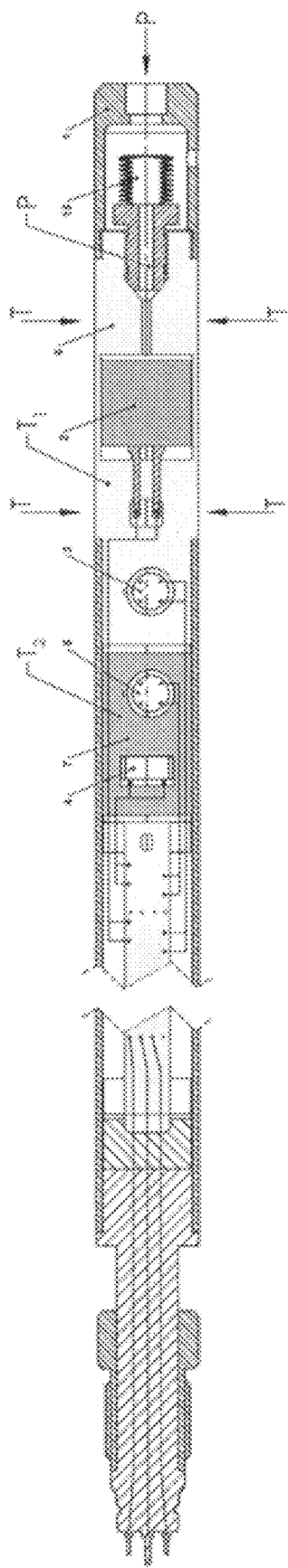

Now, referring to the second embodiment of the invention as shown in FIG. 1b of the drawings, like reference numerals will be used for the same features. A section 6 is the thermal block housing the pressure measuring portion, while a thermal block 7 is the temperature measuring housing of a transducer 1. The crystals 2 and 3 are shown as being enclosed in the same thermal block and environment. However, the crystal 3 is protected from pressure by being enclosed in an atmosphere where the pressure remains constant at all times. They are, however, subject to the effects of temperature and temperature change as they are part of the same thermal block 6. The temperature change is a function of the temperature level, the physical properties of the thermal block 6, and the crystals 2 and 3 as configured, and is characterized by a thermal time constant 11 (see FIGS. 2b and 3b).

The crystal 2 is mounted in substantially the same environment as the crystals 3 but it is mounted in such a manner that it is subject to both temperature and pressure. Further, the pressure sensor crystal 2 is placed in a chamber that is part of and is enclosed by the thermal block 6, and which is filled with an inert oil-fill. In turn, the oil-fill is pressurized through a process isolating bellows 15 of which its exterior is exposed to the environment of the transducer 1. Any temperature gradient or difference within this transducer embodiment 1 is monitored by the two reference resonators 3 and 5. As the reference resonators 3 and 5 are housed in different thermal blocks 6 and 7, any temperature change or difference between the two will be detected. As previously described, the temperature change is a function of the temperature level, the physical properties of the thermal blocks 6 and 7 as characterized by a thermal time constants 11 and 12 respectively. As with the crystals of the first embodiment described above, all of the crystals of this embodiment are also made in thickness shear mode.

Figure 2B:
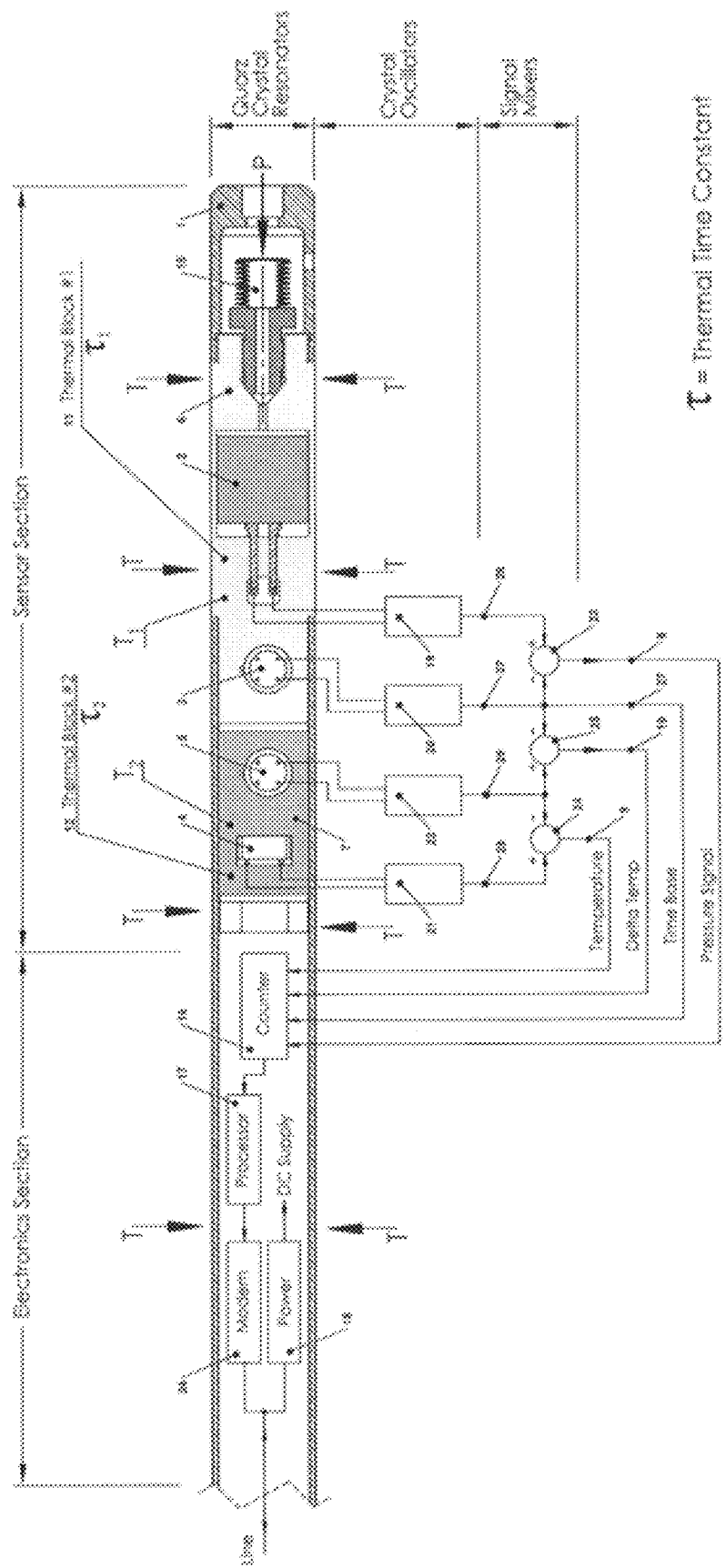

FIGS. 2a and 2b are supplementary schematic outline drawings of the two preferred embodiments of the transducer 1, and illustrate more detailed signals routing from the crystals 2, 3, 4, and 5.

Figure 3A:
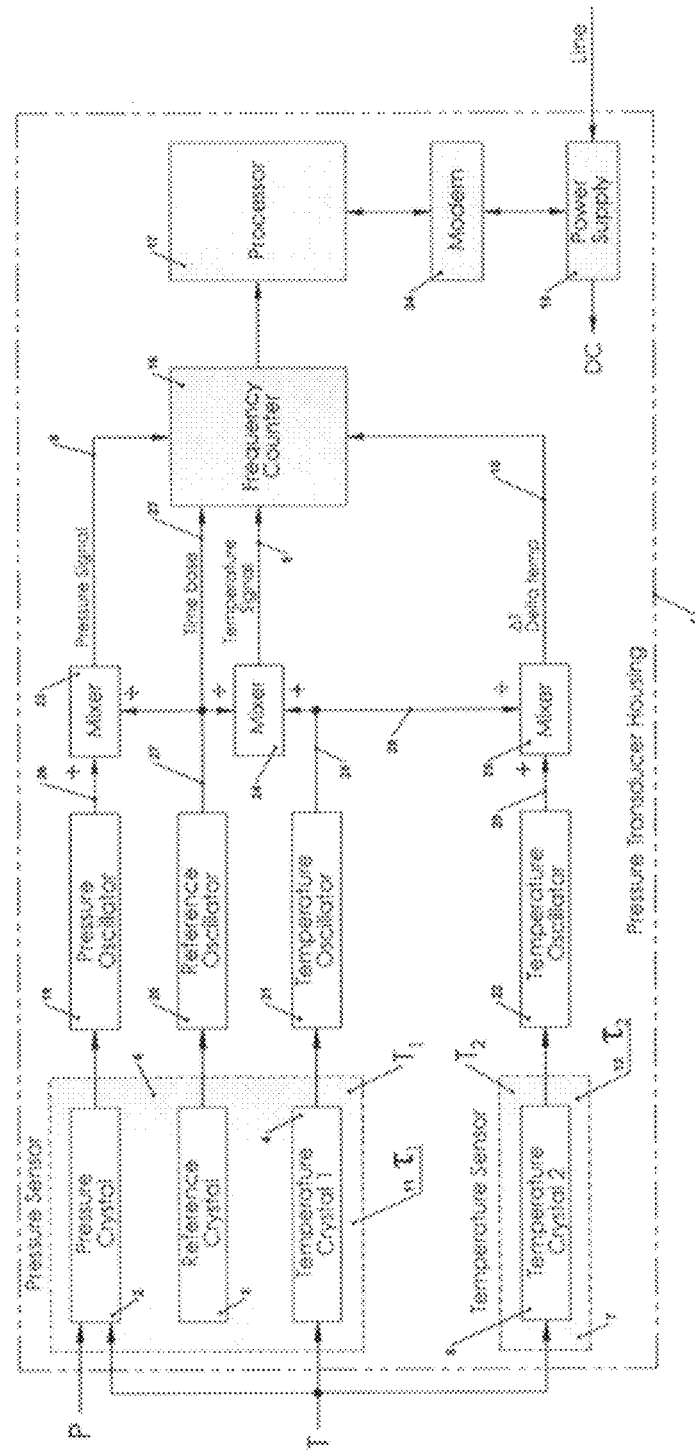
FIGS. 3a and 3b are supplementary schematics to FIGS. 2a and 2b, respectively, which, in block diagram form only, show the transducer configuration and the signal routing.

FIG. 3a is a supplementary schematic to FIG. 2a, and shows the transducer 1 sensor configuration as an illustrated functional block diagram of the first embodiment of the present invention. For temperature measurement, the temperature crystal 4 has a relatively large temperature coefficient with respect to the reference crystal 3. The temperature crystal 5 has the same temperature to frequency characteristics as the temperature crystal 4. The temperature crystal 5 is controlling the frequency of an oscillator 22. The temperature crystal 4 is controlling the output of an oscillator 21. The reference crystal 3 is controlling the frequency output of an oscillator 20. Finally, the pressure crystal 2 is controlling the output of an oscillator 19.

The outputs 26 and 27 of the oscillators 19 and 20 are fed to a mixer 23 which produces the difference frequency between the respective oscillators 19 and 20. A difference frequency 8 is fed into a frequency counter 16. The output of the frequency counter 16 is in turn fed to a computer 17 that processes the information from the pressure sensor signal 8. The output signal 8 from the mixer 23 is called the Pressure Signal, and is a function of the applied pressure and temperature of the transducer 1. Furthermore, the output 27 of the oscillator 20 is also fed directly to the frequency counter 16 and functions as a timebase or a reference time for the processing of the input frequency signals 8, 9, and 10.

In a similar manner, a frequency output 28 of the temperature oscillator 21 is fed to a mixer 24 and is mixed with the frequency output 27 of the reference oscillator 20. The output difference between the frequency inputs 27 and 28 produces a beat-frequency or a product 9, which is input to the frequency counter 16. The mixer output 9 is named the Temperature Signal, and is a function of the temperature level of the transducer 1.

The temperature crystal 5 is controlling the frequency of an oscillator 22. In turn, the frequency output 29 of the oscillator 22 is fed to a frequency mixer 25 and is mixed with the frequency output 28 of the temperature oscillator 21. The mixer 25 produces a frequency output 10 that is named the "Delta Temperature" signal. For the purpose of the rate and magnitude of the signal 10, the two temperature crystals 4 and 5 have the same temperature sensitivity, but are attached to and are part of two independent thermal blocks 6 and 7. The thermal blocks 6 and 7 are configured to have equal or different responses to temperature and temperature changes over time, which difference is characterized by the thermal time constants 11 and 12. Changes in temperature of the two thermal bodies 6 and 7 will change the output of each of the crystals, and consequently indicate any change and/or difference in temperature between the two bodies. Thus, the differential temperature between the bodies 6 and 7 will produce a change in frequency output 10 of the mixer 25, and will be counted and processed by the frequency counter 16 and the computer 17, respectively.

In order to prevent ambiguous readings, it is suggested that the differential temperature measurement is designed so that there are no convergence points over the range of use. Thus, it is practical to select the two temperature crystals 4 and 5 so that they have the same temperature to frequency sensitivity, but have sufficient difference in nominal frequency so that the frequencies of the two never converge (become equal) over the temperature and differential temperature range of use. For example, if the maximum differential temperature expected within the transducer 1 is 20° C., one would select the nominal frequency of the temperature crystal 5 so that it converges at a point 25° C. to 30° C. below the nominal frequency of the temperature crystal 4.

Although the temperature crystals 4 and 5 are illustrated as having a positive temperature coefficient, it is within the scope of this invention to provide two crystals that have a negative temperature coefficient, as long as they do not possess ambiguous frequency-temperature characteristics.

The crystal resonator 2 is mounted in the same environment 5 as the crystal resonators 3 and 4 but is separated therefrom. Whereas the crystal resonators 3 and 4 are housed so as to be free from the effects of a change in pressure, the crystal resonator 2 is housed inside a fluid-filled section subject to both temperature and pressure changes. Furthermore, any changes of temperature within the pressurized system caused by adiabatic effects will transfer to the thermal block 5 and be picked up by the temperature resonator 4.

Figure 3B:
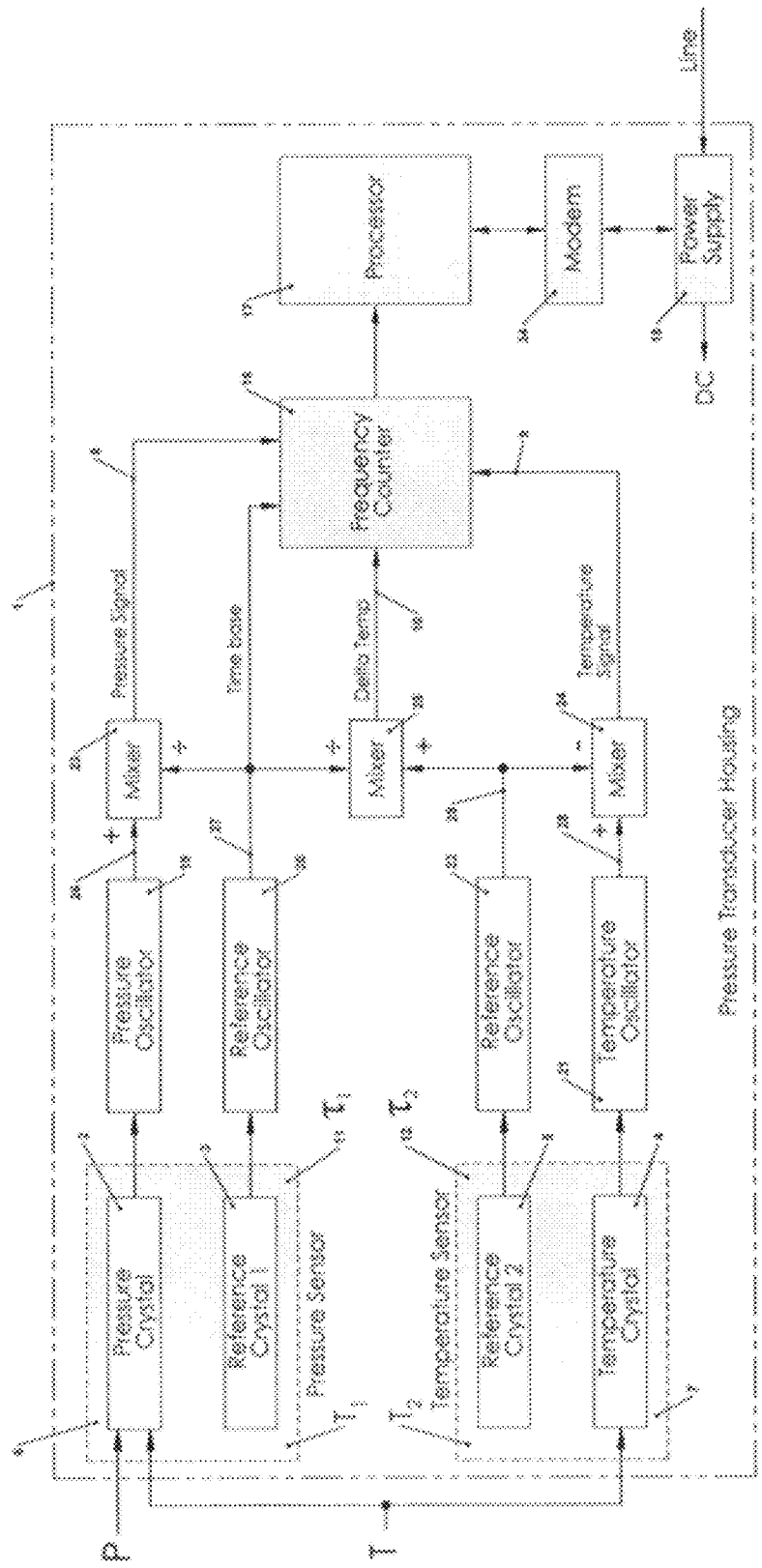

FIG. 3b is a supplementary schematic to FIG. 2b, and shows the transducer 1 sensor configuration as an illustrated functional block diagram of the second embodiment of the present invention.

For temperature measurement, the temperature crystal 4 has a relatively large temperature coefficient with respect to the reference crystal 5 and is controlling the frequency output of an oscillator 21. In turn, the reference crystal 5 has the same temperature to frequency characteristics as the reference crystal 3, and is controlling the frequency output of an oscillator 22. The reference crystal 3 controls the frequency output of a reference oscillator 20. Finally, the pressure crystal 2 has a pressure and temperature sensitivity and is controlling the output of an oscillator 19.

The outputs 26 and 27 of the oscillators 19 and 20 is fed to a mixer 23 which produces the difference frequency between the respective oscillators 19 and 20. A difference frequency 8 is fed into a frequency counter 16. The output of the frequency counter 16 is in turn fed to a processor 17 that processes the information from the pressure sensor signal 8. The output signal 8 from the mixer 23 is called the Pressure Signal, and is function of the applied pressure and temperature of the transducer 1. Furthermore, the output 27 of the oscillator 20 is also fed directly to the frequency counter 16 and functions as a timebase or a reference time for the processing of the input frequency signals 8, 9, and 10.

In a similar manner to the description above, a frequency output 28 of the temperature oscillator 21 is fed to a mixer 24 and is mixed with the frequency output 29 of the reference oscillator 22. The output difference between the frequency inputs 28 and 29 produces a beat-frequency or a product 9, which is input to the frequency counter 16. The mixer output 9 is named the Temperature Signal, and is a function of the temperature level of the transducer 1.

The reference crystal 5 is controlling the frequency of an oscillator 22. In turn, the output of the oscillator 22 is fed to a frequency mixer 25 and is mixed with the frequency output 27 of the reference oscillator 20. The mixer 25 produce a frequency output 10 that is named the "Delta Temperature" or Delta-R signal. For the purpose of the invention, the two reference crystals 3 and 5 have the same temperature sensitivity, but are attached and part of two independent thermal blocks 6 and 7. The thermal blocks 6 and 7 are configured to have equal or different responses to temperature change, and the difference between the two is characterized by their thermal time constants 11 and 12. Changes in temperature of the two thermal bodies 6 and 7 will induce a change in output. Thus, temperature change and a difference in temperature between the bodies 6 and 7 will produce a change in the frequency output 10 and will be counted and processed by the frequency counter 16 and processor 17, respectively.

In order to prevent ambiguous readings, it is suggested that the differential temperature measurement is designed so that there are no convergence points over the range of use. Thus, it is practical to select the two reference crystals 3 and 5 so that they have the same temperature to frequency sensitivity, but have sufficient difference in nominal frequency so that the frequencies of the two never converge (become equal) over the temperature and differential temperature range of use. For example, if the maximum differential temperature expected within the transducer 1 is 20° C., one would select the nominal frequency of the reference crystal 5 so that it converges at a point 25° C. to 30° C. below the nominal frequency of the reference crystal 3.

Although the reference crystals 3 and 5 are illustrated as having a positive temperature coefficient, it is within the scope of this invention to provide two crystals that have a negative temperature coefficient cut as long as they do not possess ambiguous frequency-temperature characteristics.

The crystal resonator 2 is mounted in the same environment or the thermal block 6 as the crystal resonator 3. The crystal resonator sets 4 and 5 are separated therefrom, and are placed in their own thermal block 7. However, all crystals are mounted inside the transducer housing 1 and are exposed to the same temperature environment. Nevertheless, the crystal resonators 3, 4, and 5 are mounted to be free from the effects of change in pressure, while, the crystal resonator 2 is housed inside a fluid filled section of the thermal block 6 and is subject to both temperature and pressure changes of the transducer 1 environment. Furthermore, any changes of temperature within the pressurized system caused by adiabatic effects will transfer to the thermal block 6 and induce temperature change and difference between the two thermal bodies 6 and

7. In turn, an output change of the frequency output 10 will be derived by the mixer 25 in response to the gradient condition.

Figure 4A:
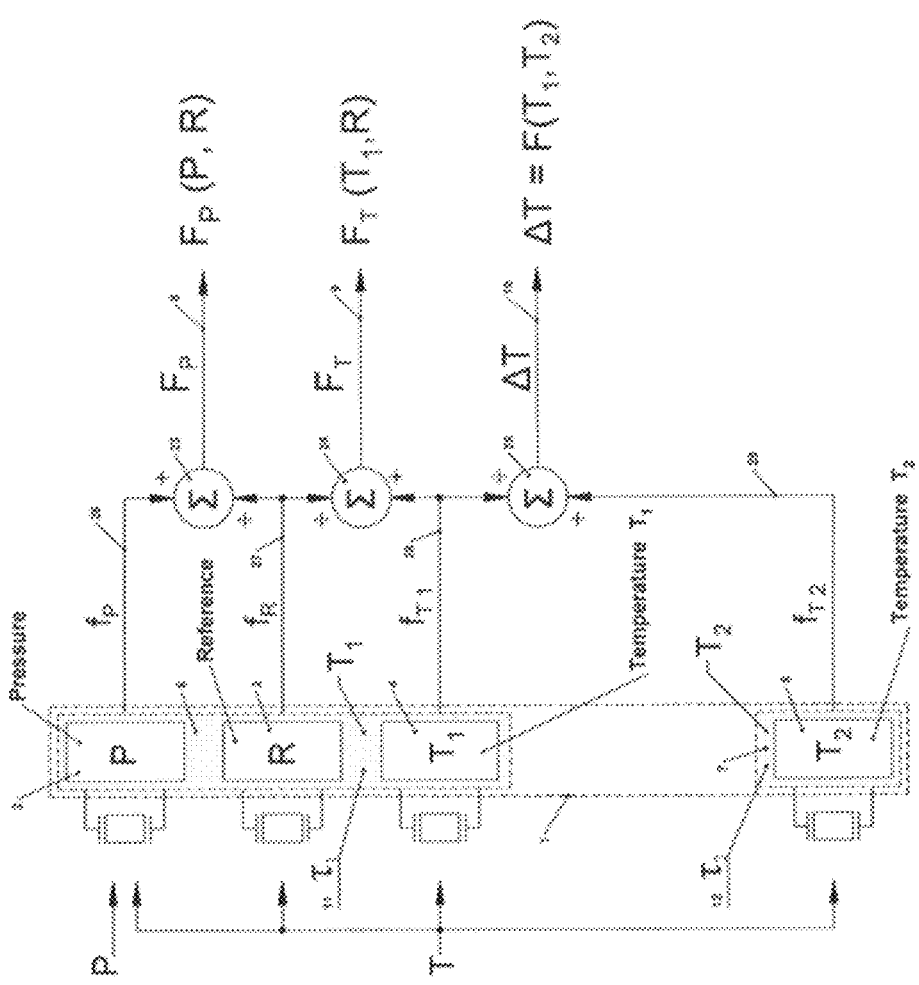

Now referring to FIG. 4a, the crystal resonator 2 is cut in thickness shear mode and is both temperature and pressure sensitive. The crystal resonator 3 is oriented and cut in a manner to be as little temperature sensitive over the temperature range as possible. However, the reference resonator 3 possesses some temperature-frequency characteristics, but these are small compared to those of the crystal resonators 2, 4, and 5. Hence, when the crystal resonator 2 is subjected to pressure, there will be an output 8 of the mixer 23 equal to the difference in frequency between the crystal resonators 2 and 3. The signal 8, Fp, will be a function of pressure and temperature and the reference of the transducer. The signal described is called Fp(P,R), and is input to the frequency counter 16.

In the same manner, the temperature resonator 4 is part of the same environment as the crystal resonators 2 and 3, but is made in a cut that is very sensitive to temperature. By doing so, an outstanding frequency-temperature response is provided when compared to the resonators 2 and 3. Hence, when the resonator 4 is subjected to the temperature, there will be an output 9 $F_T$ of mixer 24 that will equal the difference in frequency between the crystal resonators 3 and 4. The signal or beat-frequency 9, or $F_T$, will be a function of the temperature $T_1$ of the thermal block 6 and the reference R of the transducer 1. The signal and its function is expressed as $F_T(T_1,R)$.

Finally, the crystal resonator 5 is made in the same cut and sensitivity to temperature as the crystal resonator 4. However, the crystal resonator 5 is attached to the thermal block 7 and is configured to a have different time constant to temperature change than the crystal resonator 4. The crystal resonator 5 is mounted in the same transducer environment 1 as the crystal resonator 4, but is separated by thermal response means since the two thermal blocks 6 and 7 are configured to have different thermal time constants 11 and 12. The crystal resonators 4 and 5 are free from the effects of changes in pressure. However, the crystal resonator 4 will pick up pressure-induced temperature changes, e.g., within the thermal block 6, due to adiabatic effects of the pressure sensing fluid and crystal exposure.

Upon a temperature change, the two crystal resonators will possess different thermal response characteristics since the time constant of the thermal block 6 is different from that of the thermal block 7. The sensor resonator with the faster thermal response time will "race" or phase-lead the sensor resonator with the longer thermal response time since there will be an intermediate or transient period while the temperature changes, where there will be an apparent temperature difference between the two during the thermal gradient period. Consequently, as the resonator output signals 28 and 29 are mixed by the mixer 25, there will be a change in the output signal every time there is a temperature change or temperature difference between the two crystal resonators. Moreover, there will be an output 10 of the mixer 25 that is equal to the difference in frequency between the crystal resonators, which will be proportional to the difference in temperature between the two. For processing means, the output 10 of the mixer 25 is called the "ΔT" and is expressed as function $F(T_1,T_2)$. The ΔT signal is a measure of the thermal stability of the transducer assembly 1. In turn, the ΔT is used for dynamic correction of the transducer 1 pressure and temperature determination.

Now referring to FIG. 4b, the crystal resonator 2 is cut in thickness shear mode and is both temperature and pressure sensitive. The crystal resonators 3 and 5 are oriented and cut in a manner to be as little temperature sensitive over the temperature range as possible. However, the reference resonators 3 and 5 possess some temperature-frequency characteristics, but these are small compared to those of the crystal resonators 2 and 4. Hence, when the crystal resonator 2 is subjected to pressure, there will be an output 8 of the mixer 23 that is equal to the difference in frequency between the crystal resonators 2 and 3. The signal 8, Fp, will be a function of pressure/temperature and the reference #1 of the transducer. The signal described is called $Fp(P,R_{\#1})$, and is input to the frequency counter 16.

In the same manner, the temperature resonator 4 is part of the same environment as the reference resonator 5, but is made in a cut that is very sensitive to temperature. By so doing, the temperature resonator 4 provides an outstanding frequency-temperature response, compared to the resonators 2, 3, and 5. Hence, when the resonator 4 is subjected to the temperature, there will be an output 9, named $F_T$, of the mixer 24 that will equal the difference in frequency between the crystal resonator 5 and 4. The signal or beat-frequency 9, will be a function of the temperature $T_2$ of the thermal block 7. The signal and its function is expressed as $F(T,R_{\#2})$.

Finally, the crystal resonator 5 is made in the same cut and sensitivity to temperature as the crystal resonator 3. However, the crystal resonator 5 is attached to the thermal block 7 and is configured to a have different time constant to temperature change than the crystal resonator 3. The crystal resonator 5 is mounted in the same transducer 1 environment as the crystal resonator 3, but is separated by thermal response means since the two thermal blocks 6 and 7, are configured to have different thermal time constants 11 and 12. the crystal resonators 3 and 5 are free from the effects of changes in pressure. However, the crystal resonator 3 will pick up pressure-induced temperature changes, e.g., within the thermal block 6, due to adiabatic effects of the pressure sensing fluid and crystal exposure.

Upon temperature change, the two reference crystal resonators will possess different thermal response characteristics since the time constant of the thermal block 6 is different from that of thermal block 7. Thus, the reference resonator having the faster thermal response or time constant, will "race" or phase-lead the sensor resonator with the with the longer thermal response time. Consequently, there will be an apparent temperature difference between the two during thermal gradient periods that induce a change in the output signal 10. The output change will be equal to the difference in frequency between the reference crystal resonators 3 and 5, and be proportional to the difference in temperature (i.e., between the two). For processing means, the output 10 of the mixer 25 is called the ΔR and is expressed as function $F(R_{\#1},R_{\#2})$. The ΔR signal is a measure of the thermal stability of the transducer assembly 1. In turn, the ΔR is used for dynamic correction of the transducer 1 pressure and temperature determination.

Figure 5B:
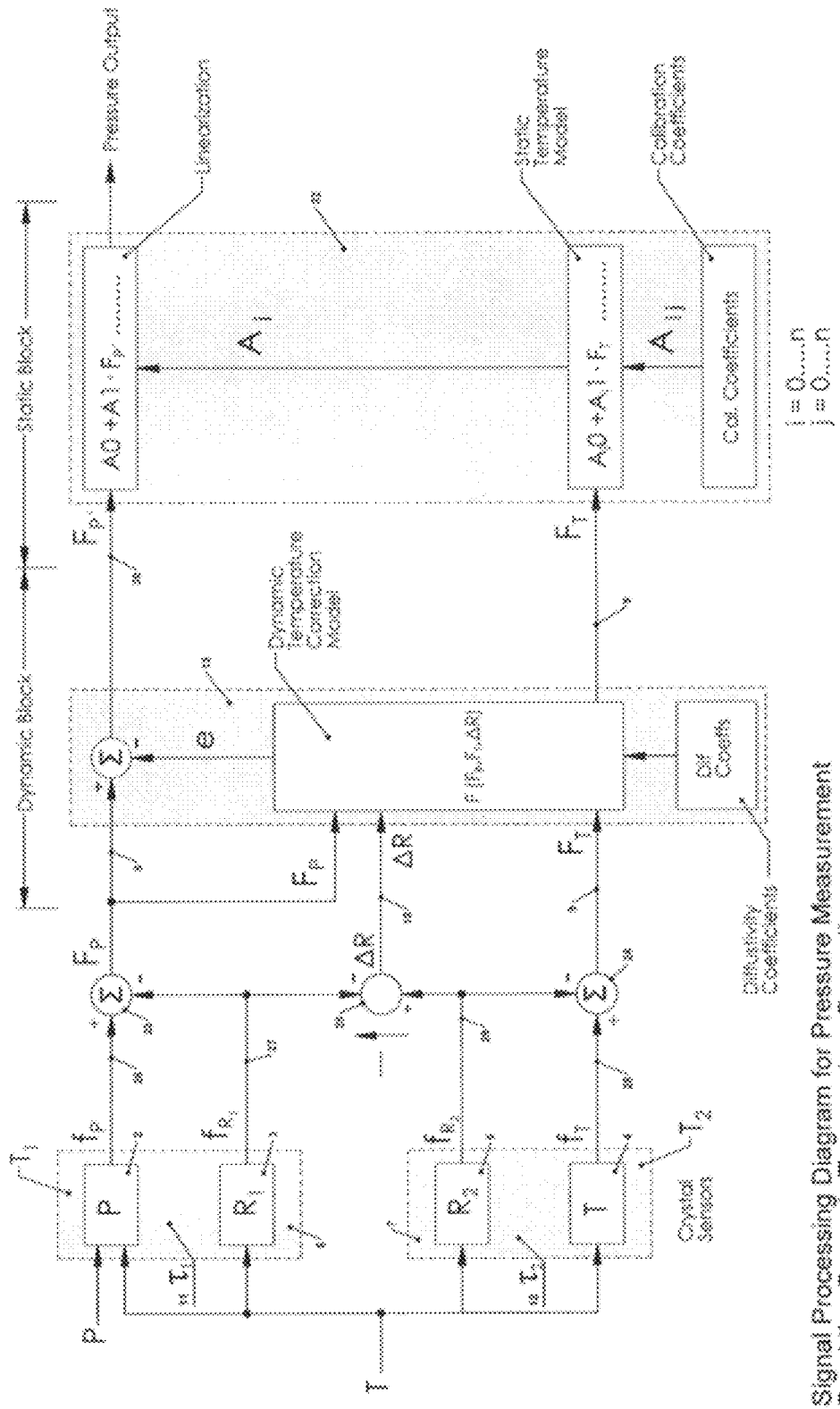

FIGS. 5a and 5b are the signal processing charts for the pressure determination of the two illustrated embodiments of the transducer 1. Outputs of the mixers 23, 24, and 25 are all fed into a Dynamic Block 13 that produces a corrective signal "e" to the output 8 of the crystal resonator 2. Within the dynamic block 13, the pressure mixer output 8 is mixed with the corrective frequency output "e" of the dynamic temperature correction model. The dynamic block 13 is made so that it processes no corrective output "e" at static temperature conditions. By these means, the nature of the dynamic block 13 is such that it provides no corrective effect to the transducer 1 pressure determination when the temperature of the transducer 1 is in steady state and there is no difference in temperature between the two internal thermal bodies 6 and 7.

Correspondingly, if there is a temperature change or difference in temperature between the thermal bodies 6 and 7, the dynamics of the block 13 will produce an output "e," equal to the anticipated frequency offset of the crystal resonator 2 caused by the temperature change or difference. By dynamics means, the corrected signal 30 is a multivariate function of which diffusivity coefficients are biased by the pressure and temperature levels 8 and 9, and is proportional to the temperature change or difference monitored by the output 10. The thermally corrected signal 30 is named $F_P$, and fed to the Static Block 32 for traditional temperature correction and linearization means. For those skilled in the art, it should be recognized that to achieve the optimum accuracy of the transducer 1 pressure determination it might be preferable to make sets of different values for the dynamic and static coefficients dedicated to each transducer manufactured. In turn, the coefficients that are derived typically depend on what temperature and pressure ranges are expected to be encountered. Both corrections and models, i.e., the dynamic block 13 and the static block 32, are not physical hardware functions, but are implemented in software, and are included as signal processing tasks of the processor 17. However, they are both thermal correction models which account for the thermal dynamics of the transducer 1 crystal resonators.

Figure 6A:
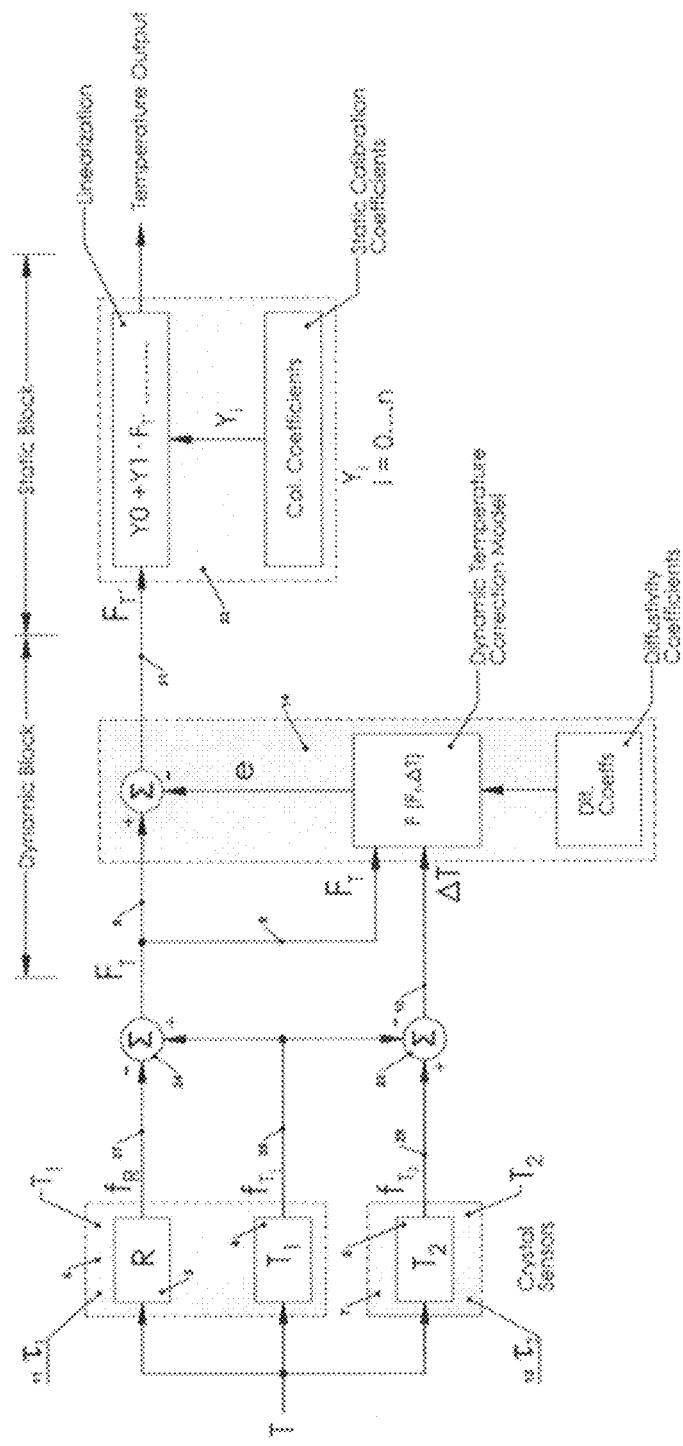
FIGS. 6a and 6b are schematics showing the full processing chart for the transducer temperature determination and include the dynamic and static temperature corrections.
Figure 6B:
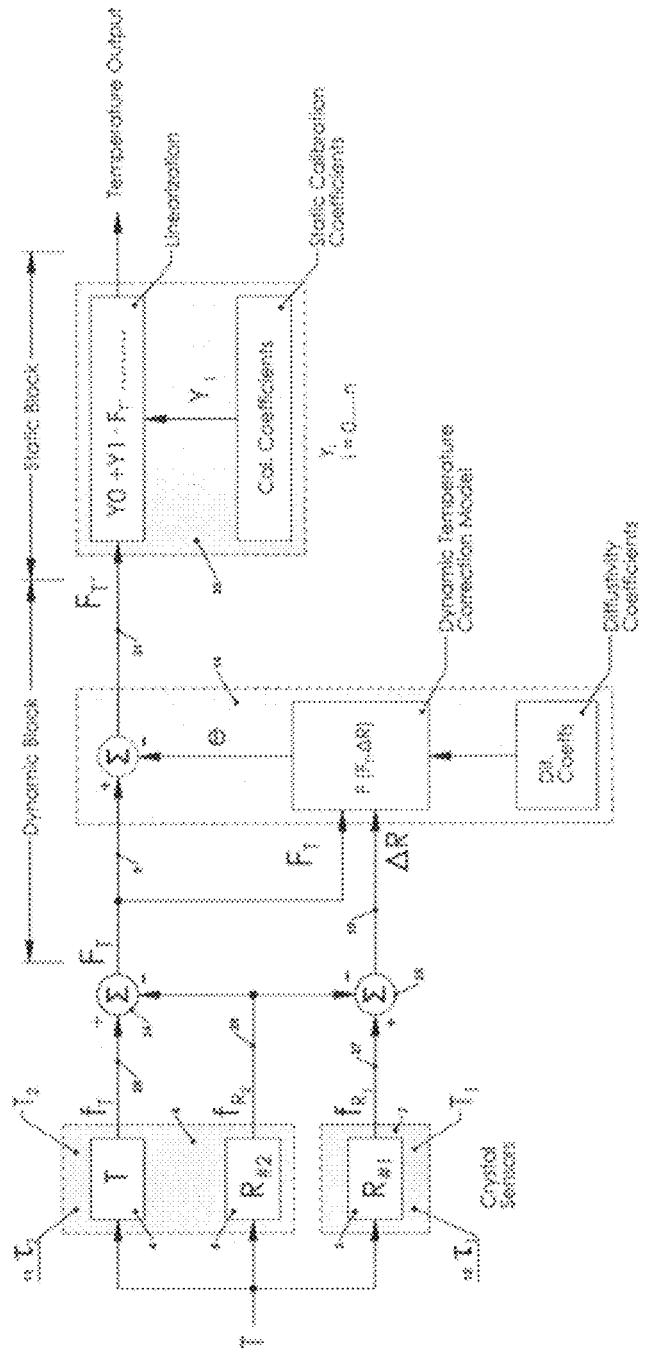

FIGS. 6a and 6b are the signal processing charts for the temperature determinations of the two illustrated embodiments of the transducer 1. Outputs of the mixer 24 and 25 are all fed into a Dynamic Block 14 that produces a corrective signal "e" to the output 9 of the crystal resonator 4. Within the dynamic block 14, the temperature mixer output 9 is mixed with the corrective frequency output "e" of the dynamic temperature correction model. The difference in frequency between the two equals the output signal 31, which in turn is thermally corrected. As with the dynamic correction block 13, the nature of the dynamic block 14 is such that it provides no corrective effect on the transducer 1 temperature determination, since the temperature of the transducer 1 is at steady state and there is no difference in temperature between the two thermal bodies 6 and 7.

Conversely, if there is a temperature change or difference in temperature between the thermal bodies, the dynamics of the block 14 will produce an output "e," equal to the anticipated frequency offset of the crystal resonator 4 caused by the temperature change or difference in progress. The corrected temperature signal 31 is a multivariate function, and its diffusivity coefficients are biased by the temperature level 9. In turn, the block output is proportional to the temperature difference and is a function of output 10. The thermally corrected signal 31 is named $F_T$, and is fed to the Static Block 33 for traditional linearization means.

For those skilled in the art, it should be recognized that to achieve the optimum accuracy of the transducer 1 temperature determination it might be preferable to make sets of different values for the dynamic and static coefficients that are dedicated for each transducer manufactured, and are depending upon what temperature ranges are expected to be encountered. Both correction models, i.e., the dynamic block 14 and the static block 33, are not physical hardware functions but are implemented in software, and are included as a signal processing tasks of the processor 17. However, they are both thermal correction models, which accounts for the thermal dynamics of the transducer 1 crystal resonators.

Figure 7A:
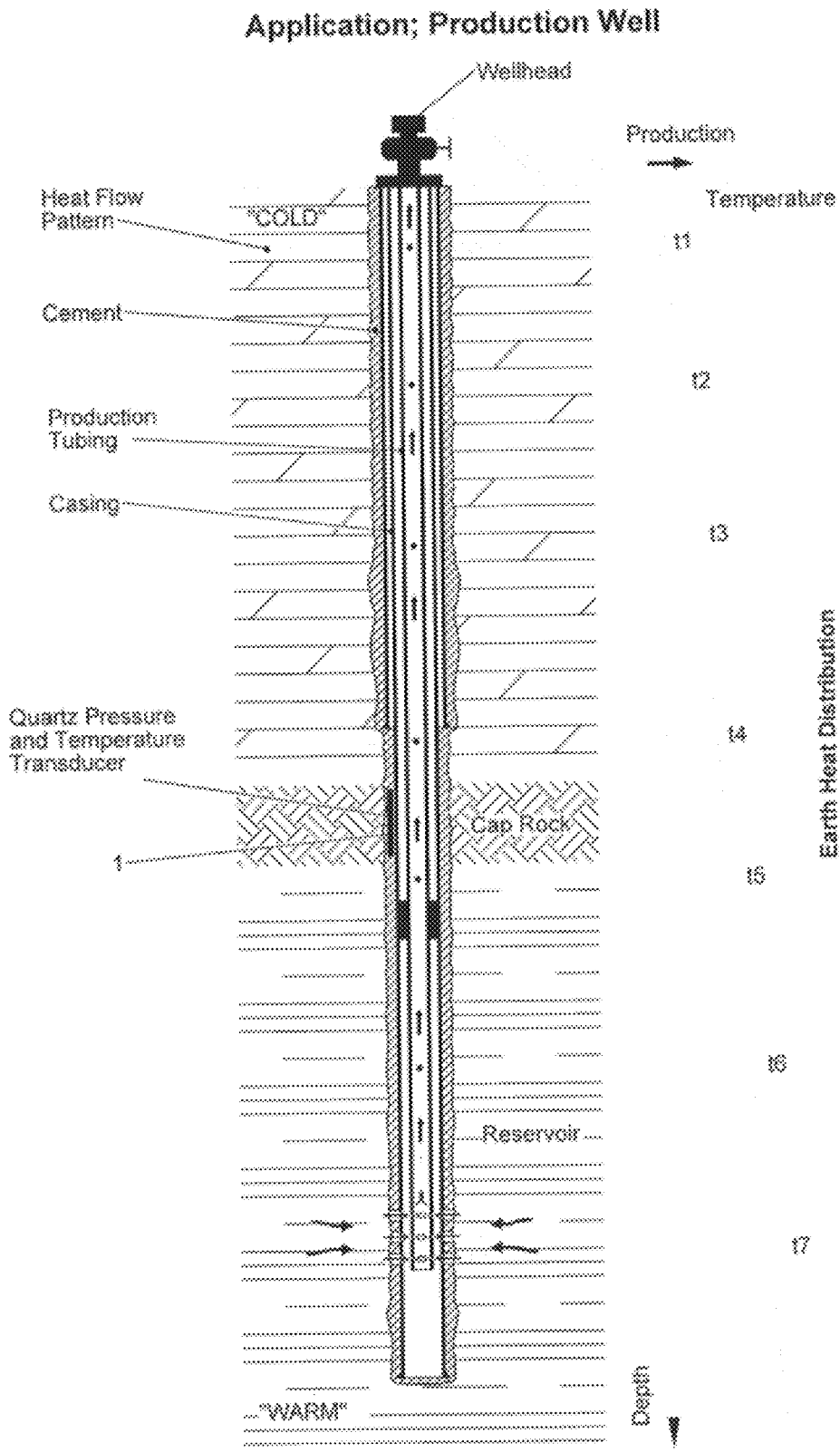
FIGS. 7a and 7b are schematics of a production well and an injection well, respectively, showing the heat and heat-flow distribution due to the process system and earth heat distribution.
Figure 7B:
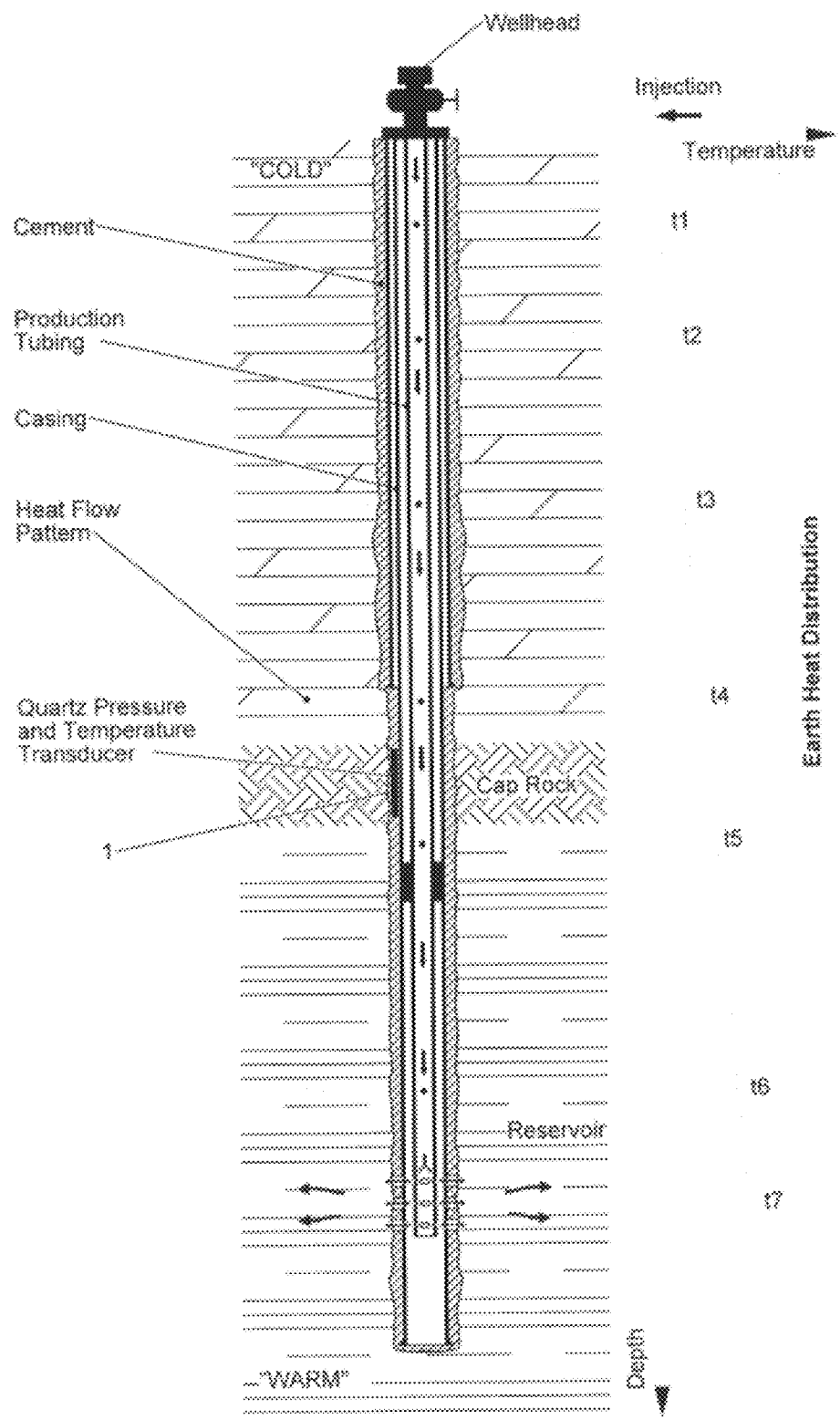

For the purpose of the invention, FIGS. 7a and 7b illustrate different service type wells. FIG. 7a shows a production type well, and FIG. 7b shows an injection type well. Both wells' production tubing is used to transport a process media consisting of gas, fluid, or a combination of both. In both applications illustrated, the process media contribute to heat transfer by convection and conduction. As within any thermal application, heat is transferred from a hot environment to a cold environment. Thus, heat will flow and transfer in the two applications as illustrated, creating a two-dimensional (axial and radial) cross sectional temperature profile.

Figure 8A:
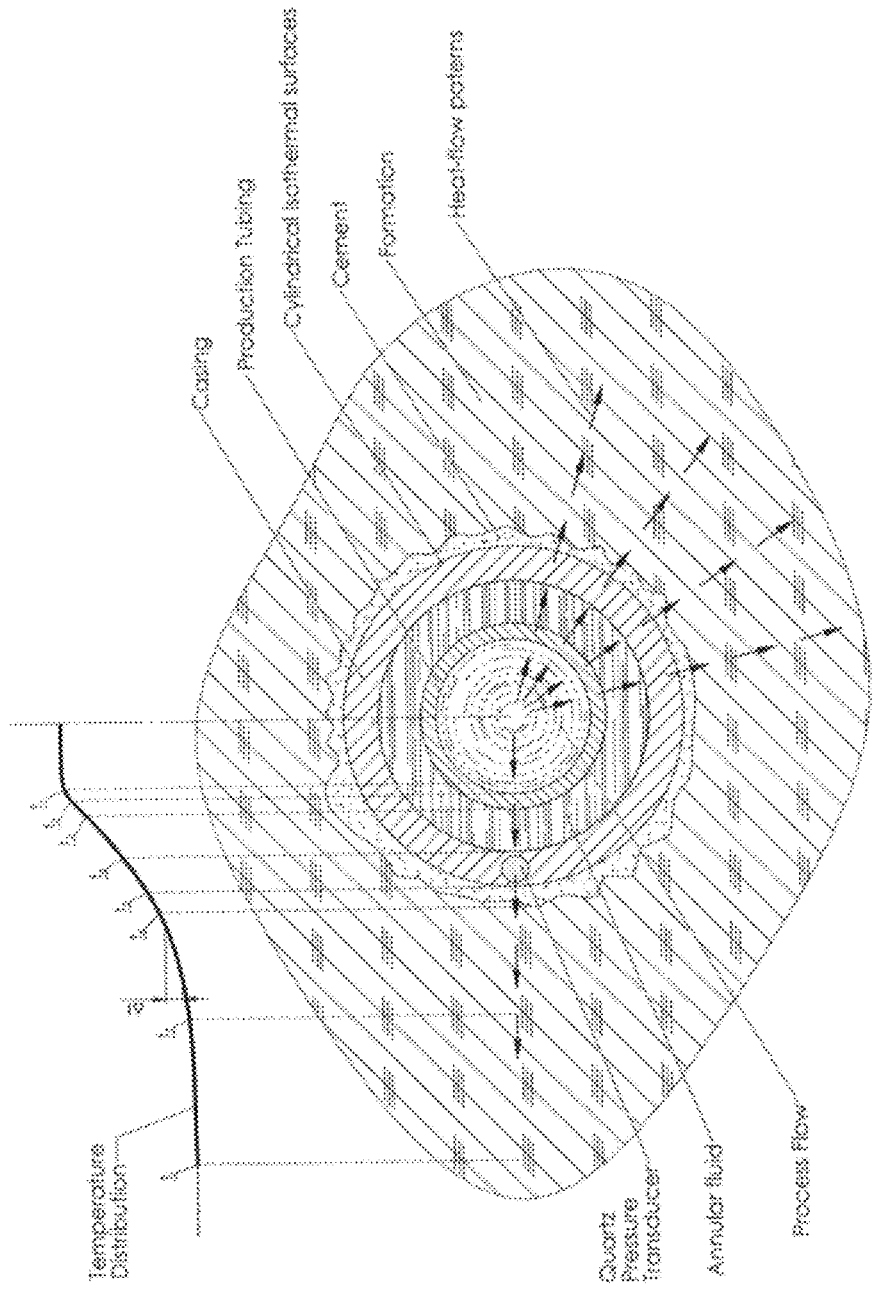
Figure 9A:
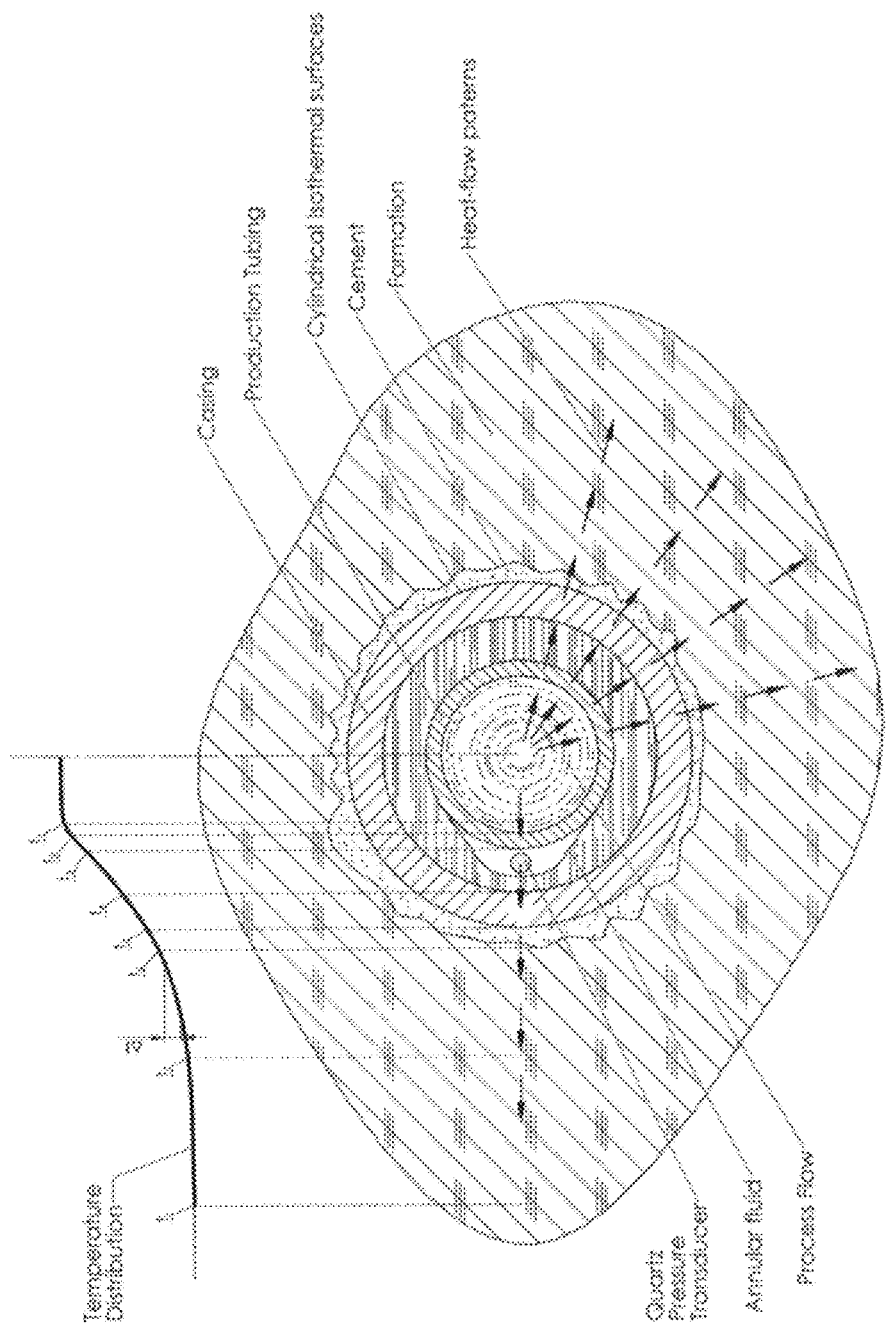
FIGS. 9a and 9b are the same as FIGS. 8a and 8b, except for a tubular mounted Pressure and Temperature Transducer Assembly.
Figure 9B:
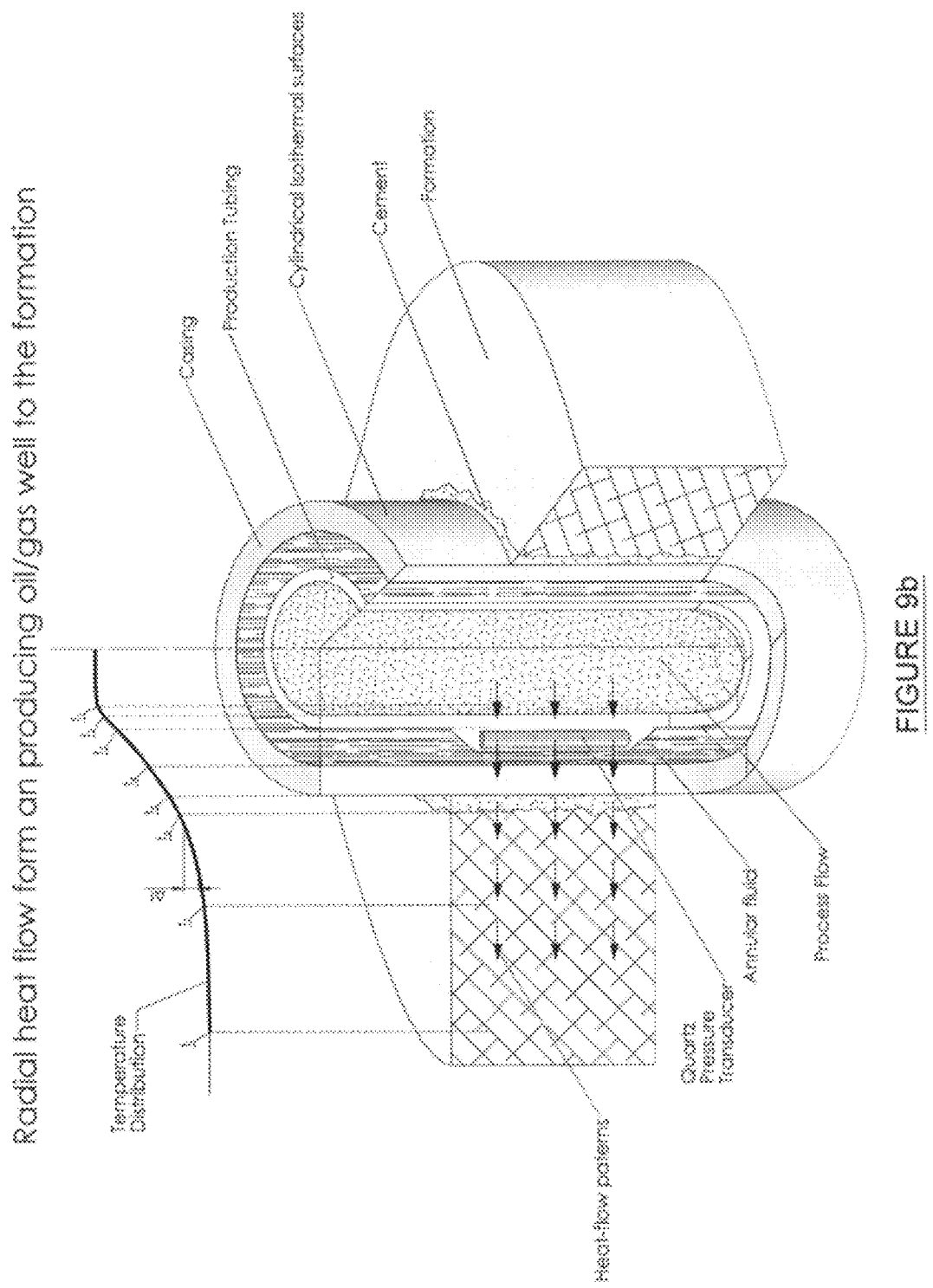

FIGS. 8a, 8b, 9a, and 9b show in greater detail the transducer 1 location as mounted to the well completion. In FIGS. 8a and 8b, the transducer 1 is attached to the wall of the wellbore casing, and in FIGS. 9a and 9b, it is attached to the tubing or completion. FIGS. 8 and 9 show the well in cross-sectional views, and illustrate the radii temperature profile as induced by heat transfer.

Figure 10:
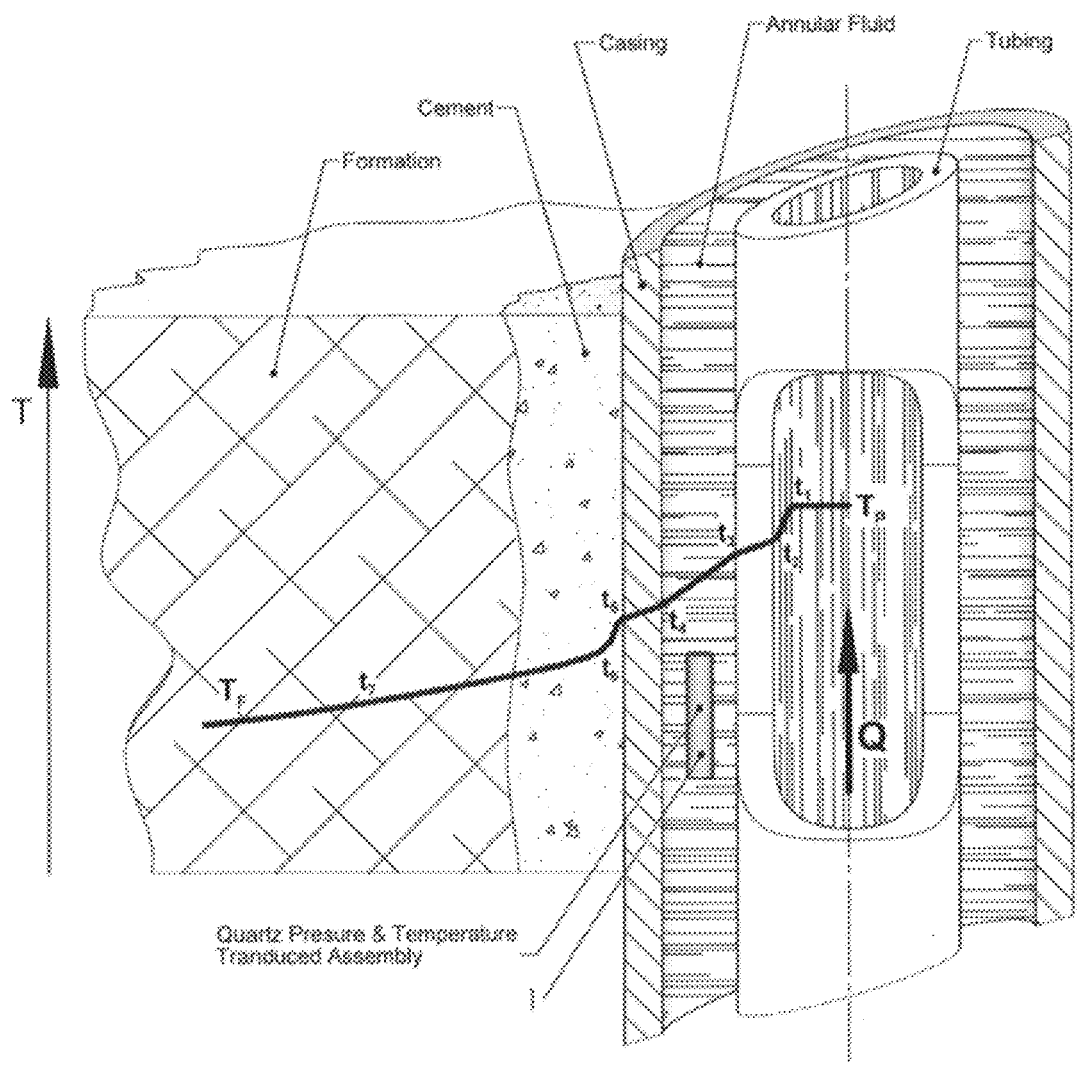
FIGS. 10, 11, and 12 are schematics showing magnified and more detailed pictures of the 1-dimensional and 2-dimensional radial heat flow or heat exchange between a warm production fluid and a colder formation; heat transfer creates isothermal surfaces throughout the wellbore conduits, and it will be understood that these schematics illustrate the heat distribution as well as the temperature gradient of a permanent Pressure and Temperature Transducer Assembly as this invention will see in an actual mounting location.
Figure 11:
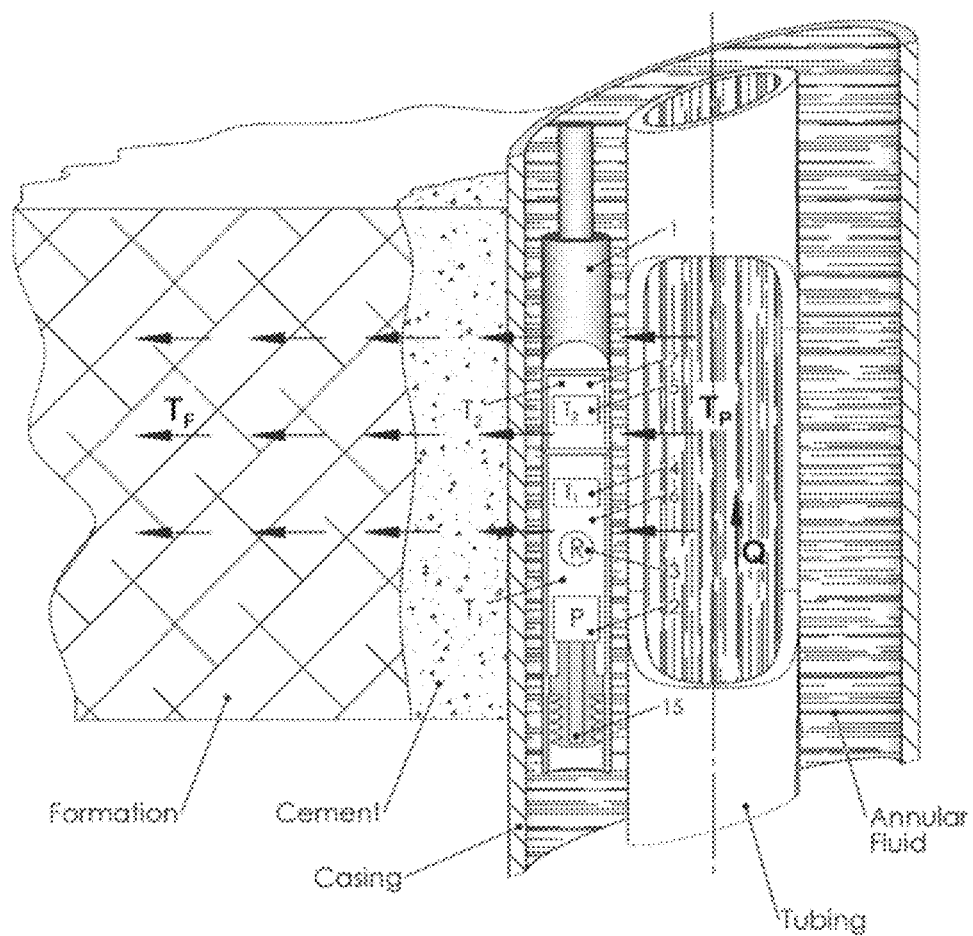
Figure 12:
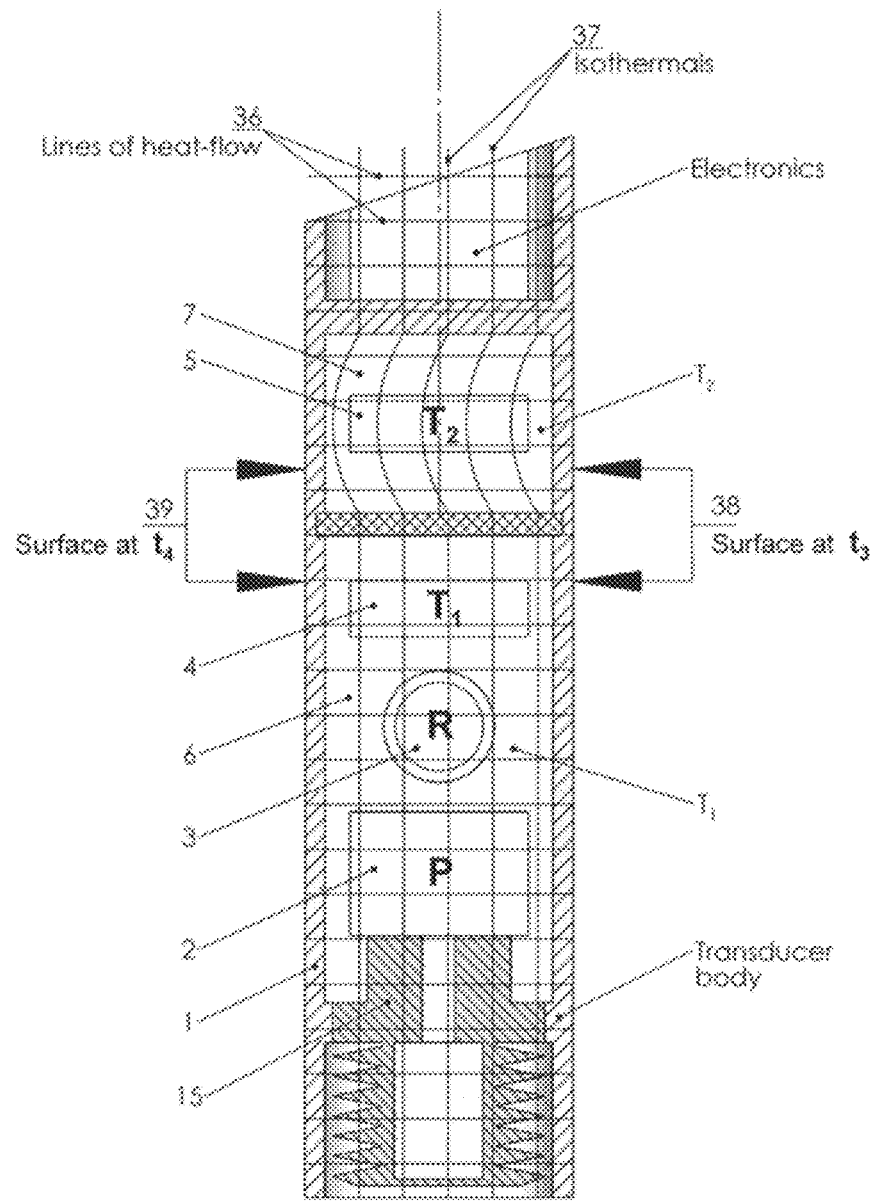

Referring to FIGS. 10, 11, and 12, these figures show a more detailed view of the wellbore temperature profile in respect to the transducer 1 and its mounting. FIG. 10 shows the envisioned temperature profile induced by heat conduction from the production media through the wellbore conduits. FIG. 11 shows the one-dimensional heat conduction in a well with a permanent pressure and temperature transducer installed. FIG. 12 shows the heat flow in the quartz pressure and temperature transducer, with an assumption that temperature $t_3$ is greater than temperature $t_4$.

The figures are made for the purpose of this invention to illustrate the need for dynamic temperature correction means since the transducer 1 mounting location is by definition inside a thermal gradient zone. Moreover, due to process load changes, the illustrated temperature profile will fluctuate and induce thermal gradients within the transducer 1. The temperature profile within the transducer 1 is illustrated by the lines of heat-flow 36 and isothermals 37 (see FIG. 12) in the direction of heat drop or transfer through the transducer cross-section. Due to heat transfer from the well to the surrounding formation, the transducer 1 is held at high $t_3$ (38) at one side and low $t_4$ (39) where the heat exit. Again, this is to illustrate the need for dynamic temperature correction of the transducer 1 pressure and temperature determination as required by gradient environment and location.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A transducer assembly, comprising:
   first, second, third, and fourth crystal controlled oscillators;
   first, second, third, and fourth thickness shear mode crystal quartz resonators, wherein the first, second, third, and fourth oscillators are respectively controlled by the first, second, third, and fourth crystal quartz resonators;

wherein the first crystal quartz resonator and the second crystal quartz resonator respectively comprise a pressure resonator and a reference resonator that are configured together as a pressure sensor providing a frequency output;

wherein the third crystal quartz resonator comprises a first temperature resonator that is configured as a temperature sensor providing a frequency output;

wherein the fourth crystal quartz resonator comprises a second temperature sensor resonator and is part of the same holder as the reference resonator and the temperature resonator or is part of a different holder; and wherein a frequency output of the fourth oscillator is mixed with a frequency output of the third oscillator to derive a dynamic thermal output.

2. A transducer assembly as defined in claim 1, wherein the pressure resonator and the reference resonator are individually mounted or are mounted together in a holder.

3. A transducer assembly as defined in claim 2, in which the holder has an inert hydraulic fluid fill which houses the pressure resonator and is exposed to applied pressure through a process isolating bellows.

4. A transducer assembly as defined in claim 1, wherein the pressure resonator and the reference resonator are mounted in the same holder to facilitate an improvement of the thermal response characteristics of the transducer assembly.

5. A transducer assembly as defined in claim 1, wherein the temperature resonator and the reference resonator can be individually mounted or mounted in the same housing or holder.

6. A transducer assembly as defined in claim 5, wherein the reference resonator and the first temperature resonator are mounted in the same holder to facilitate an improvement of the thermal response characteristics of the transducer assembly.

7. A transducer assembly as defined in claim 1, wherein the temperature resonator and the second temperature resonator have the same temperature-to-frequency characteristics.

8. A transducer assembly as defined in claim 1, wherein the first temperature resonator and the second temperature resonator are individual units and are mounted in different holders or are mounted in a common or the same holder and provide first and second characteristic thermal time constants, respectively.

9. A transducer assembly as defined in claim 8, wherein the first and second thermal time constants are different.

10. A transducer assembly as defined in claim 1, wherein combination of the frequency outputs of the fourth oscillator and the third oscillator produces an output signal having a response that is dynamic and is related to the temperature difference between the first temperature resonator and the second temperature resonator.

11. A transducer assembly as defined in claim 10, wherein the response is characterized by the temperature change, the thermal time constants, and the physical properties of the first temperature resonator and the second temperature resonator.

12. A transducer assembly as defined in claim 10, wherein the response is related to the physical properties of a transducer housing and the environment, including the physical properties of the latter.

13. A transducer assembly as defined in claim 10, wherein the difference in temperature is used together with a temperature sensor output as inputs to dynamic feed-forward correction systems.

14. A transducer assembly as defined in claim 13, wherein the correction system is used to provide dynamic correction of the transducer pressure determination.

15. A transducer assembly as defined in claim 13, wherein the correction system is used to provide dynamic correction of the transducer temperature determination.

16. A transducer assembly as defined in claim 13, wherein the dynamic feed-forward correction system will improve the thermal response of the transducer pressure determination since the dynamics of the output signal is a true and real measure of the transducer thermal stability and can be effectively used to predict when and how much corrective action is needed to eliminate gross pressure offsets during gradients.

17. A transducer assembly as defined in claim 13, wherein the dynamic feed-forward correction system will improve the thermal response of the transducer temperature determination as since the dynamics of the output signal is a true and real measure of the transducer thermal stability and can be effectively used to predict when and how much corrective action is needed to eliminate gross temperature offsets during gradients.

18. A transducer assembly as defined in claim 13, wherein the dynamic feed-forward correction system applies a method derived to suppress the offsets induced by implementing a thermal diffusion model inverting the thermal response of the respective transducer sensor, and in which the diffusion model, which is a function of the temperature level and the gradient, improves the phase response of the measurement and speeds up the transducer performance to monitor the correct pressure and temperature.

19. A transducer assembly as defined in claim 1, wherein the fourth crystal quartz resonator comprises a second reference resonator, the second reference resonator and the first temperature resonator being configured together as a temperature sensor providing frequency output.

20. A transducer assembly as defined in claim 19, wherein the pressure resonator and the reference resonator are individually mounted or are mounted in the same holder.

21. A transducer assembly as defined in claim 20, wherein the holder has an inert hydraulic fluid filling the housing around the pressure resonator, and is exposed to applied pressure through a process isolating bellows.

22. A transducer assembly as defined in claim 19, wherein the pressure resonator and the reference resonator are mounted in the same holder to facilitate an improvement of the thermal response characteristics of the transducer assembly.

23. A transducer assembly as defined in claim 19, wherein the first temperature resonator and the second reference resonator can be individually mounted or mounted in the same holder.

24. A transducer assembly as defined in claim 23, wherein the first temperature resonator and the second reference resonator comprise a temperature sensor and are mounted in the same holder as the pressure resonator and the reference resonator.

25. A transducer assembly as defined in claim 23, wherein the first temperature resonator and the second reference resonator are mounted in the holder to facilitate an improvement of the thermal response characteristics of the transducer assembly.

26. A transducer assembly as defined in claim 23, wherein the two reference resonator and the second reference resonator have the same temperature-to-frequency characteristics.

27. A transducer assembly as defined in claim 26, wherein a frequency output of the second oscillator is mixed with a frequency output of the fourth oscillator to derive a dynamic thermal output.

28. A transducer assembly, comprising:
first, second, third, and fourth crystal controlled oscillators;
first, second, third, and fourth thickness shear mode crystal quartz resonators, wherein the first, second, third, and fourth oscillators are respectively controlled by the first, second, third, and fourth crystal quartz resonators;
wherein the first crystal quartz resonator and the second crystal quartz resonator respectively comprise a pressure resonator and a reference resonator that are configured together as a pressure sensor providing a frequency output;
wherein the third crystal quartz resonator comprises a temperature resonator that is configured as a temperature sensor providing a frequency output;
wherein the fourth crystal quartz resonator comprises a temperature sensor;
wherein the fourth crystal quartz resonator comprises a second reference resonator, the second reference resonator and the temperature resonator being configured together as a temperature sensor providing frequency output;
wherein each of the reference resonator and the second reference resonator is an individual unit and is mounted in a different holder, and providing their provides its own characteristic thermal time constant.

29. A transducer assembly, comprising:
first, second, third, and fourth crystal controlled oscillators;
first, second, third, and fourth thickness shear mode crystal quartz resonators, wherein the first, second, third, and fourth oscillators are respectively controlled by the first, second, third, and fourth crystal quartz resonators;
wherein the first crystal quartz resonator and the second crystal quartz resonator respectively comprise a pressure resonator and a reference resonator that are configured together as a pressure sensor providing a frequency output;
wherein the third crystal quartz resonator comprises a temperature resonator that is configured as a temperature sensor providing a frequency output;
wherein the fourth crystal quartz resonator comprises a temperature sensor;
wherein the fourth crystal quartz resonator comprises a second reference resonator, the second reference resonator and the temperature resonator being configured together as a temperature sensor providing frequency output;
wherein each of the reference resonator and the second reference resonator is an individual unit and is mounted in the same holder, and provides its own characteristic thermal time constant.

30. A transducer assembly as defined in claim 29, wherein the thermal time constants are different.

31. A transducer assembly, comprising:
first, second, third, and fourth crystal controlled oscillators;
first, second, third, and fourth thickness shear mode crystal quartz resonators, wherein the first, second, third, and fourth oscillators are respectively controlled by the first, second, third, and fourth crystal quartz resonators;
wherein the first crystal quartz resonator and the second crystal quartz resonator respectively comprise a pressure resonator and a reference resonator that are configured together as a pressure sensor providing a frequency output;
wherein the third crystal quartz resonator comprises a temperature resonator that is configured as a temperature sensor providing a frequency output;
wherein the fourth crystal quartz resonator comprises a temperature sensor;
wherein the fourth crystal quartz resonator comprises a second reference resonator, the second reference resonator and the temperature resonator being configured together as a temperature sensor providing frequency output;
wherein the mixing combining the frequency outputs of the second oscillator and the fourth oscillator produces an output signal having a response that is dynamic and is related to the temperature difference between the reference resonator and the second reference resonator.

32. A transducer assembly as defined in claim 31, wherein the response is characterized by the temperature change, the thermal time constants, and the physical properties of the reference resonator and the second reference resonator.

33. A transducer assembly as defined in claim 31, wherein the response is related to the physical properties of a transducer housing and the environment, including the physical properties of the latter.

34. A transducer assembly as defined in claim 31, wherein the difference in temperature is used together with a temperature sensor output as inputs to dynamic feed-forward correction systems.

35. A transducer assembly as defined in claim 34, wherein the dynamic feed-forward correction system is used to provide dynamic correction of the transducer pressure determination.

36. A transducer assembly as defined in claim 34, wherein the dynamic feed-forward correction system is used to provide dynamic correction of the transducer temperature determination.

37. A transducer assembly as defined in claim 34, wherein the dynamic feed-forward correction system will improve the thermal response of the transducer pressure determination as since the dynamics of the output signal is a true and real measure of the transducer thermal stability and can be effectively used to predict when and how much corrective action is needed to avoid gross pressure offsets during gradients.

38. A transducer assembly as defined in claim 34, wherein the dynamic feed-forward correction system will improve the thermal response of the transducer temperature determination since the dynamics of the output signal is a true and real measure of the transducer thermal stability and can be effectively used to predict when and how much corrective action is needed to avoid gross temperature offsets during gradients.

39. A transducer assembly as defined in claim 34, wherein the dynamic feed-forward correction system is a method derived to suppress the offsets induced by implementing a thermal diffusion model inverting the thermal response of the respective transducer sensor, and in which the diffusion model, which is a function of the temperature level and the gradient, is added to improve the phase response of the measurement and speed up the transducer performance to monitor correct pressure and temperature.

40. A transducer assembly as defined in claim 28, wherein the thermal time constants are different.

* * * * *